US012533898B2

(12) United States Patent
Moriyama et al.

(10) Patent No.: US 12,533,898 B2
(45) Date of Patent: Jan. 27, 2026

(54) RECORDING APPARATUS AND RECORDING METHOD

(71) Applicant: SEIKO EPSON CORPORATION, Tokyo (JP)

(72) Inventors: Ryuji Moriyama, Matsumoto (JP); Yoshihiko Momose, Shiojiri (JP); Kazuma Ozaki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 18/611,826

(22) Filed: Mar. 21, 2024

(65) Prior Publication Data

US 2024/0316963 A1 Sep. 26, 2024

(30) Foreign Application Priority Data

Mar. 24, 2023 (JP) ................................ 2023-047849

(51) Int. Cl.

*B41J 25/308* (2006.01)
*B41J 29/02* (2006.01)
*B41J 29/393* (2006.01)
*B41J 2/01* (2006.01)

(52) U.S. Cl.

CPC ......... *B41J 25/3088* (2013.01); *B41J 29/023* (2013.01); *B41J 29/393* (2013.01); *B41J 2/01* (2013.01)

(58) Field of Classification Search

CPC .... B41J 25/3088; B41J 29/023; B41J 29/393; B41J 2/01

See application file for complete search history.

(56) References Cited

U.S. PATENT DOCUMENTS

2007/0009275 A1* 1/2007 Yokoyama ........... B41J 11/0095 399/69
2014/0292890 A1* 10/2014 Tokai .................. B41J 2/04556 347/19
2018/0215142 A1* 8/2018 Ishikawa .............. B41J 11/0095
2019/0299683 A1* 10/2019 Takakusa ................. B41J 19/14
2023/0242359 A1* 8/2023 Kamiyama ............ B65H 5/025 271/272

FOREIGN PATENT DOCUMENTS

JP 2020-062828 A 4/2020

* cited by examiner

*Primary Examiner* — Henok D Legesse
(74) *Attorney, Agent, or Firm* — WORKMAN NYDEGGER

(57) ABSTRACT

A recording apparatus including a medium supporting part, a recording unit, a movement unit, a height detection unit, and a control unit. The control unit causes the height detection unit to perform the primary detection and the secondary detection, in the primary detection, the displacement detection unit detects the contact and the non-contact with the medium while moving the contact part in a first direction such that when the contact is detected, a movement in the first direction is interrupted, and that the movement in the first direction is restarted after the medium supporting part is separated from the movement unit by a first distance, and in the secondary detection, the displacement detection unit detects the contact and the non-contact with the medium while moving the contact part in a second direction opposite to the first direction such that when the contact is detected.

6 Claims, 21 Drawing Sheets

RECORDING APPARATUS AND RECORDING METHOD

The present application is based on, and claims priority from JP Application Serial Number 2023-047849, filed Mar. 24, 2023, the disclosure of which is hereby incorporated by reference herein in its entirety.

BACKGROUND

1. Technical Field

The present disclosure relates to a recording apparatus and a recording method.

2. Related Art

In the related art, a recording apparatus for adjusting the positional relationship between a medium for printing and a recording unit has been known. For example, JP-A-2020-62828 discloses an ink-jet printer for adjusting the distance between a printing medium and an ink-jet head in the up-down direction. This ink-jet printer includes a detection mechanism for detecting the height of the upper end of the printing medium to adjust the above-mentioned distance.

With the apparatus disclosed in JP-A-2020-62828, however, it is difficult to reduce the apparatus size. Specifically, the apparatus is a so-called serial printer, and performs printing through scanning of the ink-jet head with respect to the printing medium. A detection member is attached on the lower side of a holding member at a position outside the scanning range of the ink-jet head. As such, the detection member should be disposed so as not to interfere with the scanning of the ink-jet head. Consequently, the detection member protrudes at the end portion of the holding member, making it difficult to reduce the apparatus size.

In addition, with the apparatus disclosed in JP-A-2020-62828, it is difficult to reduce the time required for the detection of the height of the printing medium. Specifically, as described in paragraph 31 of JP-A-2020-62828, it is necessary to adjust the height of the table such that the lower end portion of the detection member makes contact with the printing medium placed on the table. In other words, the height of the table needs to be manually adjusted. In addition, if the detection operation is repeated to improve the detection accuracy, it could take even longer. That is, there is a demand for a recording apparatus that can achieve both the reduction of the apparatus size and the reduction of the detection time of the height of the medium.

SUMMARY

A recording apparatus includes a medium supporting part configured to support a medium, a recording unit configured to perform recording on the medium, a movement unit configured to relatively move with respect to the medium supporting part along a first axis, a detection unit attached to the movement unit, and a control unit. The detection unit includes an arm part turnably coupled to the movement unit, a contact part fixed at one end of the arm part, and a displacement detection unit configured to detect contact and non-contact of the contact part and the medium, the contact part is disposed to overlap the medium supporting part in a second axis orthogonal to the first axis, the medium supporting part is configured to relatively move along a third axis orthogonal to the first axis and the second axis with respect to the movement unit, the arm part turns about a turning shaft when the contact part makes contact with the medium while the movement unit moves, the displacement detection unit detects the contact and the non-contact based on a turn of the arm part, the control unit causes the detection unit to perform primary detection and secondary detection subsequent to the primary detection, in the primary detection, the displacement detection unit detects the contact and the non-contact while moving the contact part in a first direction along the first axis such that when the contact is detected, a movement in the first direction is interrupted, and that the movement in the first direction is restarted after the medium supporting part is separated from the movement unit by a first distance along the third axis, and in the secondary detection, the displacement detection unit detects the contact and the non-contact while moving the contact part in a second direction opposite to the first direction such that when the contact is detected, a movement in the second direction is interrupted, and that the movement in the second direction is restarted after the medium supporting part is separated from the movement unit along the third axis until the non-contact is detected.

A recording method uses a recording apparatus, the recording apparatus including a medium supporting part configured to support a medium, a recording unit configured to perform recording on the medium, a movement unit configured to relatively move with respect to the medium supporting part along a first axis, a detection unit attached to the movement unit, and a control unit. The detection unit includes an arm part turnably coupled to the movement unit, a contact part fixed at one end of the arm part, and a displacement detection unit configured to detect contact and non-contact of the contact part and the medium, the contact part is disposed to overlap the medium supporting part in a second axis orthogonal to the first axis, the medium supporting part is configured to relatively move along a third axis orthogonal to the first axis and the second axis with respect to the movement unit, the arm part turns about a turning shaft when the contact part makes contact with the medium while the movement unit moves, the displacement detection unit detects the contact and the non-contact based on a turn of the arm part, the control unit causes the displacement detection unit to perform primary detection and secondary detection subsequent to the primary detection, in the primary detection, the displacement detection unit detects the contact and the non-contact while moving the contact part in a first direction along the first axis such that when the contact is detected, a movement in the first direction is interrupted, and that the movement in the first direction is restarted after the medium supporting part is separated from the movement unit by a first distance along the third axis, and in the secondary detection, the displacement detection unit detects the contact and the non-contact while moving the contact part in a second direction opposite to the first direction such that when the contact is detected, a movement in the second direction is interrupted, and that the movement in the second direction is restarted after the medium supporting part is separated from the movement unit along the third axis until the non-contact is detected.

DESCRIPTION OF EMBODIMENTS

In the embodiments described below, a recording apparatus that performs recording on a medium and a recording method using the recording apparatus are exemplified and described with reference to the accompanying drawings.

In the following drawings, XYZ axes are illustrated as necessary as coordinate axes orthogonal to each other. The direction each arrow points is the +direction, and the direction opposite to the +direction is the −direction. The Y axis is along the front-rear direction of the recording apparatus, and the +Y direction is the front side of the recording apparatus. The X axis is along the left-right direction of the recording apparatus, and the +X direction is the right side of the recording apparatus. The Z axis is a virtual axis along the vertical direction, and the +Z direction and the −Z direction are the upward direction and downward direction, respectively in the recording apparatus. The direction along the X axis is the left-right direction, the direction along the Y axis is the front-rear direction, and the direction along the Z axis is the up-down direction. Note that the Y axis corresponds to the first axis of the present disclosure, the X axis corresponds to the second axis of the present disclosure, and the Z axis corresponds to the third axis of the present invention.

Figure 1:
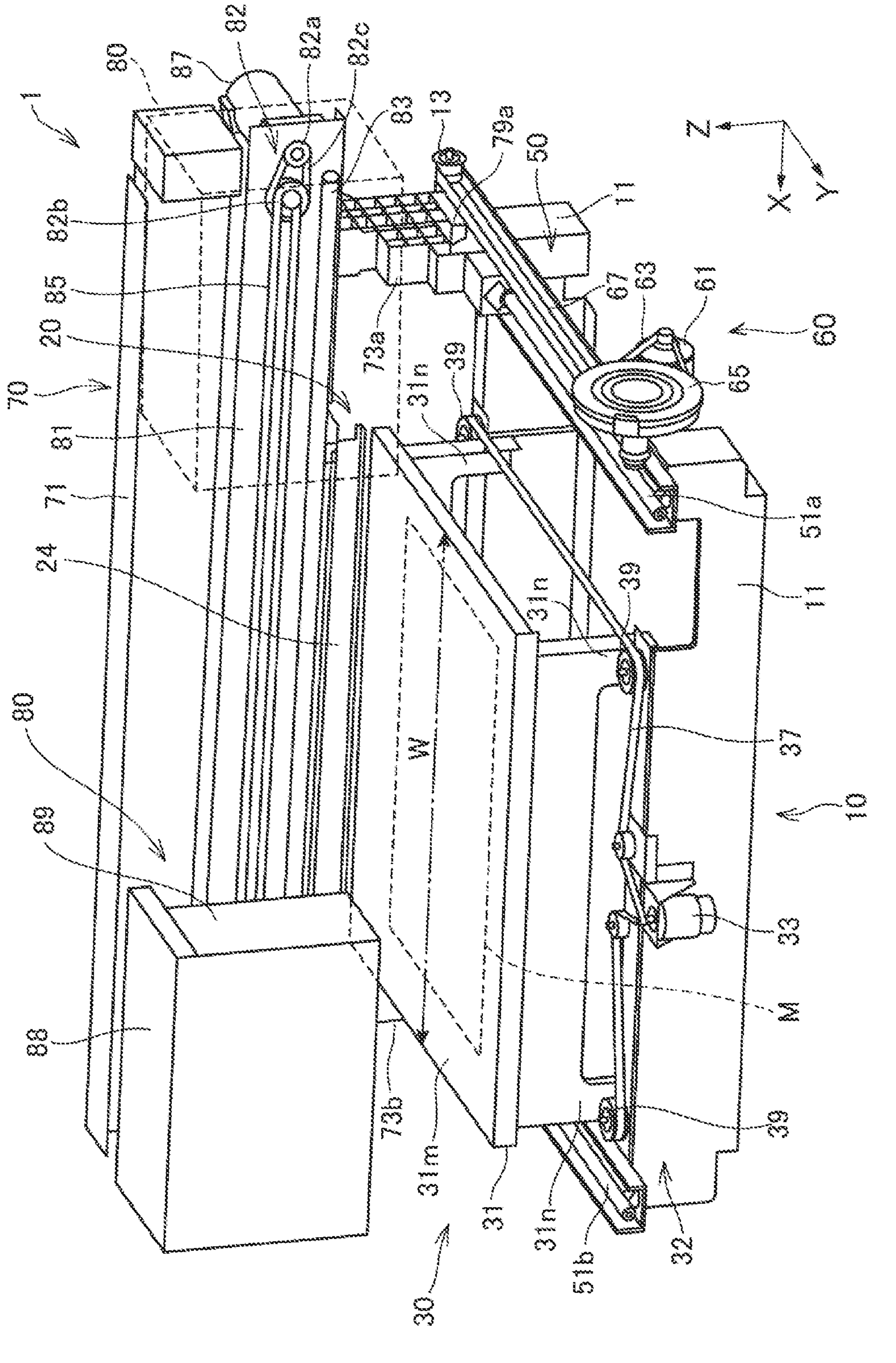
FIG. 1 is a perspective view of a recording apparatus according to an embodiment.

As illustrated in FIG. 1, a recording apparatus 1 according to this embodiment includes a body unit 10, a medium supporting part 31*m*, a recording unit 80 including a recording head 89, a movement unit 70 that is a moving frame of a so-called gantry type, a height detection unit 20 serving as a detection unit, and a control unit and a notification unit not illustrated in the drawing. The recording apparatus 1 is an ink-jet printer, but the recording apparatus of the present disclosure is not limited to this.

In the recording apparatus 1, liquid is ejected to a medium M from the recording head 89. In this manner, the recording unit 80 performs recording on the medium M. Examples of the medium M include sheets composed of paper, resin and the like, fabrics such as non-woven fabrics, knitted fabrics, and cloths, and three-dimensional articles. Examples of the three-dimensional article include various objects such as clothing and shoes, ornaments, daily necessities, machine parts, cell phone cases, and golf balls.

Examples of the liquid ejected from the recording apparatus 1 to the medium M include processing liquid and coating liquid in addition to ink containing color materials. For example, by attaching inks of a plurality of types to the surface of the medium M as the above-mentioned liquid, images and the like are formed on the medium M. In this case, the medium M corresponds to a printing medium.

The recording apparatus 1 includes a table 31. The table 31 is a base that does not move in the X axis direction and the Y axis direction. The top surface of the table 31 is the medium supporting part 31*m*. The medium supporting part 31*m* is a flat surface on which the medium M can be placed, and supports the medium M. The shape and size of the medium M are not limited as long as the medium M is not protruded from the medium supporting part 31*m*. In addition, an end of the medium M may protrude from the medium supporting part 31*m*. The height of the medium M corresponds to the size of the medium M in the +Z direction. The height of the medium M may be any size within a range in which the table 31 can vertically move as described later.

The recording apparatus 1 supports and fixes the medium M by means of the medium supporting part 31*m*. The recording apparatus 1 causes the recording head 89 to perform scanning above the medium M supported by the medium supporting part 31*m*, and ejects liquid to the medium M from the recording head 89.

The body unit 10 is a pedestal fixed to the installation surface of the recording apparatus 1 such as the floor. The movement unit 70 moves along the Y axis with respect to the body unit 10.

The body unit 10 includes a base unit 11, a medium support mechanism 30, and a driving mechanism 50. The base unit 11 is fixed to the installation surface of the recording apparatus 1 to support each unit of the recording apparatus 1. FIG. 1 illustrates an example in which a pair of the rod-shaped base units 11 are disposed side by side along the Y axis.

The medium support mechanism 30 includes the table 31 and a height adjustment mechanism 32. The table 31 includes a rectangular flat plate, and four table leg parts 31*n* disposed at the four corners of the flat plate. The top surface of the above-mentioned flat plate is the medium supporting part 31*m*. With the height adjustment mechanism 32, the table 31 and the medium supporting part 31*m* can move along the Z axis with respect to the movement unit 70.

The height adjustment mechanism 32 includes a lifting motor 33, a lifting belt 37, and a lifting mechanism 39. The height adjustment mechanism 32 moves the medium supporting part 31*m* in the direction along the Z axis. The lifting mechanism 39 is provided for each of the four table leg parts 31*n*.

The lifting mechanism 39 includes a ball screw disposed along the Z axis, a nut threadedly engaged with the ball screw, and a pulley not illustrated in the drawings. The ball screw of the lifting mechanism 39 is rotatably supported at the base unit 11. The nut of the lifting mechanism 39 is fixed to the table leg part 31*n*. The pulley of the lifting mechanism 39 is fixed to the upper part of the ball screw. When the pulley of the lifting mechanism 39 rotates, the ball screw rotates, and the table leg part 31*n* moves along the Z axis together with the nut along with the rotation of the ball screw.

The lifting motor 33 is a motor that rotates under the control of a control unit 90 described later. The control unit 90 controls the rotational direction and rotation amount of the lifting motor 33. The lifting belt 37 is an annular belt provided around the output shaft of the lifting motor 33 and the pulleys of the four lifting mechanisms 39. The lifting belt 37 is driven into circulation by the rotation of the lifting motor 33. The lifting belt 37 transmits the rotation of the lifting motor 33 to the pulleys of the four lifting mechanisms 39. In this manner, the ball screw of the lifting mechanism 39 rotates and the table 31 moves along the Z axis.

The rotational direction of the lifting motor 33 can be switched between the forward direction of moving the table 31 upward, and the opposite direction of moving the table 31 downward. In the recording apparatus 1, the table 31 is moved up or down by operating the lifting motor 33.

The driving mechanism 50 includes a first guide shaft 51*a*, a second guide shaft 51*b*, and a frame driving unit 60. The first guide shaft 51*a* and the second guide shaft 51*b* are provided along the Y axis across the pair of the base units 11. The first guide shaft 51*a* is fixed to the left end portion of the base unit 11, and the second guide shaft 51*b* is fixed to the right end portion of the base unit 11.

The movement unit 70 includes a main frame 71, a first leg part 73*a*, a second leg part 73*b*, and the recording unit 80. The movement unit 70 relatively moves along the Y axis with respect to the medium supporting part 31*m*.

The main frame 71 is a plate-shaped member elongated in the direction along the X axis direction. The size of the main frame 71 in the left-right direction is greater than the base unit 11. The first leg part 73*a* can fit with the first guide shaft 51*a*, and move along the first guide shaft 51*a*. The second leg part 73*b* can fit with the second guide shaft 51*b*, and move along the second guide shaft 51*b*. The main frame 71 is fixed on the first leg part 73*a* and the second leg part 73*b*, and supported by the first leg part 73*a* and the second leg part 73*b* from below. The first leg part 73*a* is located at the left end portion of the main frame 71, and the second leg part 73*b* is located at the right end portion of the main frame 71. The main frame 71 is guided by the first guide shaft 51*a* and the second guide shaft 51*b* together with the first leg part 73*a* and the second leg part 73*b* to move along the Y axis.

The frame driving unit 60 includes a frame moving motor 61, a transmission belt 63, a transmission mechanism 65, and a transmission belt 67.

The frame moving motor 61 is a motor that rotates under the control of the control unit 90 described later. The transmission belt 63 is an annular belt provided around the output shaft of the frame moving motor 61 and the transmission mechanism 65, and transmits the driving force of the frame moving motor 61 to the transmission mechanism 65. The transmission mechanism 65 includes a first pulley and a second pulley. The transmission belt 63 is wound around the first pulley, and the transmission belt 67 is wound around the second pulley. The transmission mechanism 65 drives the transmission belt 67 by rotating the second pulley with the driving force transmitted from the transmission belt 63 to the first pulley. The transmission mechanism 65 transmits the driving force of the frame moving motor 61 to the transmission belt 67 by a reduction ratio corresponding to the ratio of the diameters of the first pulley and the second pulley.

The transmission belt 67 is an annular belt provided around the transmission mechanism 65 and a pulley 13 disposed at an end portion of the base unit 11 in the −Y direction. The pulley 13 is installed in a rotatable manner with respect to the base unit 11. The transmission belt 67 is disposed along the first guide shaft 51*a*. The first leg part 73*a* is fixed to the transmission belt 67 through a belt coupling part 79*a*. Thus, when the transmission belt 67 is driven into circulation, a power of moving the first leg part 73*a* along the Y axis acts on the first leg part 73*a*. In this manner, the movement unit 70 moves along the Y axis.

The rotational direction of the frame moving motor 61 can be switched between the forward direction of moving the main frame 71 in the +Y direction, and the opposite direction of moving the main frame 71 in the −Y direction. In the recording apparatus 1, the main frame 71 is moved forward and rearward by operating the frame moving motor 61.

The movement of the second leg part 73*b* of the movement unit 70 is guided by the second guide shaft 51*b*. Thus, the main frame 71 translates in the +Y direction and the −Y direction along the first guide shaft 51*a* and the second guide shaft 51*b*. The +Y direction corresponds to the first direction of the present disclosure, and the −Y direction corresponds to the second direction of the present disclosure opposite to the first direction. Note that in the present disclosure, the first direction may also be the −Y direction, and the second direction may also be the +Y direction.

A carriage support frame 81, a transmission mechanism 82, a carriage guide shaft 83, and a carriage drive motor 87 are installed at the main frame 71. The recording unit 80 includes a carriage 88 and the recording head 89.

The carriage support frame 81 is a plate-shaped member elongated in the direction along the X axis direction. The carriage guide shaft 83 is fixed along the X axis at the carriage support frame 81. The carriage 88 is supported by the carriage support frame 81 and the carriage guide shaft 83, and can move along the carriage guide shaft 83. In the movement range of the carriage 88 along the X axis, the left end position is the home position. A mechanism for performing maintenance such as flushing and cleaning of the recording head 89 is disposed at the home position. In FIG. 1, the home position of the carriage 88 is illustrated with the broken line.

A carriage drive belt 85 is an annular belt provided around the transmission mechanism 82 disposed at the left end portion of the carriage support frame 81 and a pulley not illustrated in the drawing disposed at the right end portion of the carriage support frame 81. The carriage drive belt 85 is disposed along the carriage guide shaft 83.

The carriage drive motor 87 is a motor that rotates under the control of the control unit 90 not illustrated in the drawing. The transmission mechanism 82 includes a pulley 82*a*, a two-stage pulley 82*b*, and a belt 82*c*.

The pulley 82*a* is fixed to the output shaft of the carriage drive motor 87. The belt 82*c* is an annular belt provided around the pulley 82*a* and the two-stage pulley 82*b*. The two-stage pulley 82*b* includes a small pulley and a large pulley with a larger diameter than that of the small pulley. The belt 82*c* is wound around the large pulley, and the carriage drive belt 85 is wound around the small pulley. The belt 82*c* rotates the large pulley of the two-stage pulley 82*b* by being driven into circulation along with the rotation of the carriage drive motor 87. The small pulley of the two-stage pulley 82*b* rotates together with the large pulley to drive the carriage belt 85 into circulation. Thus, the rotation of the carriage drive motor 87 is transmitted to the carriage drive belt 85 by a reduction ratio corresponding to the ratio of diameters of the large pulley and the small pulley in the two-stage pulley 82*b*.

The carriage 88 is coupled to the carriage drive belt 85. Thus, when the carriage drive belt 85 is driven into circulation, the carriage 88 moves along the X axis. The recording head 89 is mounted in the carriage 88. When the carriage 88 moves along the X axis, the recording head 89 moves in the left-right direction, i.e., the direction along the X axis. In addition, when the main frame 71 moves along the Y axis, the recording head 89 moves in the front-rear direction, i.e., the direction along the Y axis. In this manner, in the recording apparatus 1, the recording head 89 can be moved in the front-rear direction and the left-right direction with respect to the table 31. Therefore, liquid such as ink can be ejected and attached to a desired position on the medium M supported by the table 31.

The recording head 89 includes a plurality of nozzles not illustrated in the drawing for ejecting liquid. The nozzles are open at the lower end surface of the recording head 89. When the liquid is ejected from the nozzles of recording head 89, the ejected liquid flies between the lower end surface of the recording head 89 and the medium M placed on the table 31, and impinges on the medium M.

Here, the distance between the lower end of the recording head 89 and the medium M is referred to as recording gap. To perform high-quality recording on the medium M, the recording apparatus 1 has a function of adjusting the size of the recording gap. Specifically, the recording apparatus 1 performs the adjustment to obtain the recording gap of an appropriate size by moving up or down the table 31, i.e., the medium supporting part 31*m* by operating the lifting motor 33. This adjustment may be automatically performed by the control unit described later, or performed in accordance with the user's instruction.

The height detection unit 20 is attached to the movement unit 70. The height detection unit 20 detects the height of the medium M placed on the table 31. The height of the medium M is the position of the upper end of the medium M in the direction along the Z axis. The recording apparatus 1 detects the height of the medium M to adjust the above-mentioned recording gap.

The height detection unit 20 includes a contact plate 24 disposed to protrude downward from the lower end of the main frame 71. The contact plate 24 is a plate-shaped member elongated in the direction along the X axis direction, and is attached to the main frame 71 in a displaceable manner as described later. The height detection unit 20 detects displacement of the contact plate 24.

The contact plate 24, or more specifically a contact part 24*a* described later, is disposed to overlap the medium supporting part 31*m* in the X axis orthogonal to the Y axis. Specifically, a range W of the position of the medium supporting part 31*m* and the contact plate 24 overlap each other in the X axis. Thus, by using the contact plate 24 it is possible to detect the relative position with respect to the recording head 89 for the entirety of the medium M placed on the medium supporting part 31*m* by using the contact plate 24.

Figure 2:
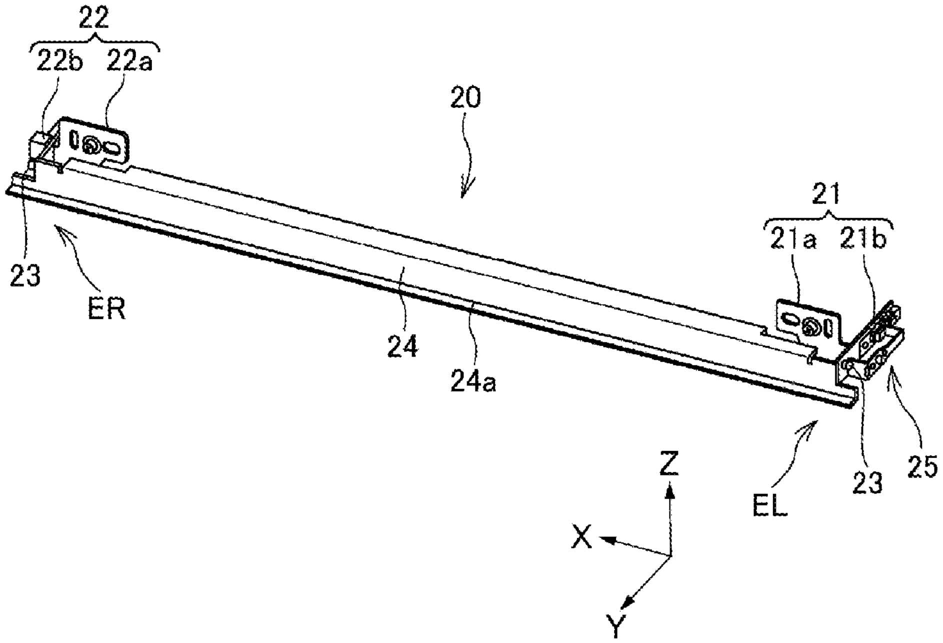
FIG. 2 is a perspective view of a height detection unit.
Figure 3:
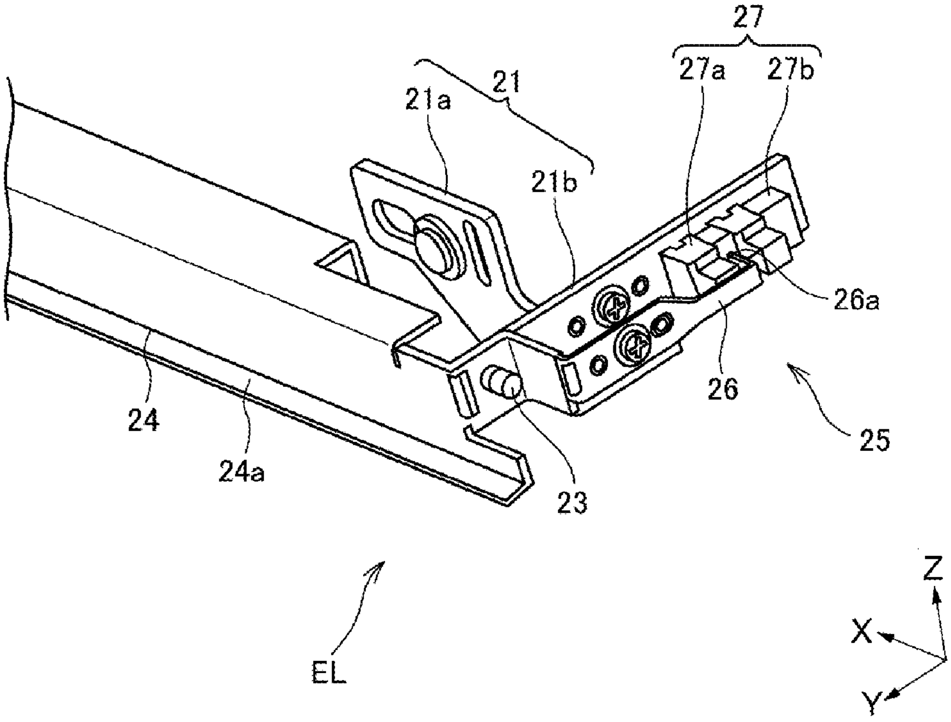
FIG. 3 is an enlarged perspective view of a main part of the height detection unit.
Figure 4:
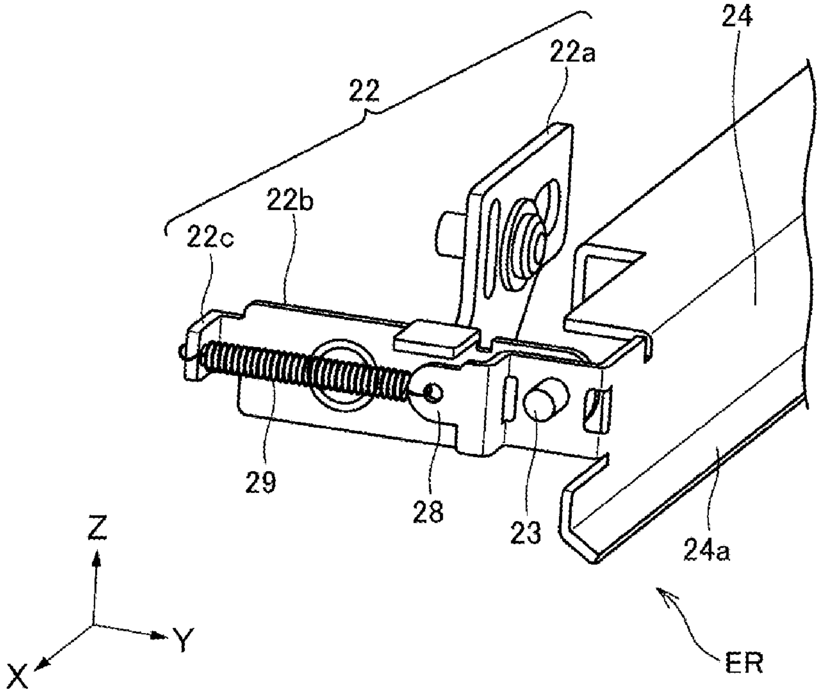
FIG. 4 is an enlarged perspective view of a main part of the height detection unit.
Figure 5:
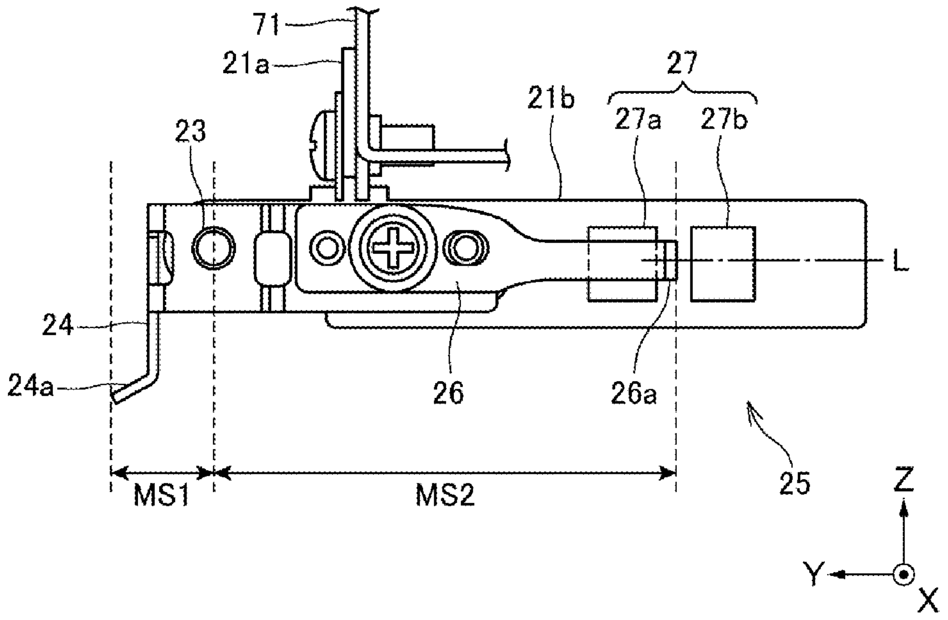
FIG. 5 is a side view of the height detection unit.

FIG. 2 is a perspective view of the height detection unit 20. FIG. 3 is an enlarged perspective view of a main part of the height detection unit 20, and illustrates a left end portion EL of the height detection unit 20 in an enlarged manner. FIG. 4 is an enlarged perspective view of a main part of the height detection unit 20, and illustrates a right end portion ER of the height detection unit 20 in an enlarged manner. FIG. 5 is a side view of the height detection unit 20.

The height detection unit 20 includes a supporting unit 21, a supporting unit 22, a turning shaft 23, the contact plate 24 including the contact part 24*a*, and a displacement detection unit 25. The supporting unit 21 supports the contact plate 24 at the left end portion EL of the height detection unit 20. The supporting unit 22 supports the contact plate 24 at the height detection unit 20 the right end portion ER.

The supporting unit 21 includes a bracket 21*a* and a coupling part 21*b*. The bracket 21*a* is fixed to the lower end portion of the main frame 71. The coupling part 21*b* is a plate-shaped part extending in the −Y direction from the bracket 21*a*. The left end portion of the contact plate 24 is attached to the coupling part 21*b* by means of the turning shaft 23.

The supporting unit 22 includes a bracket 22*a*, a coupling part 22*b*, and a protrusion 22*c*. The bracket 22*a* is fixed to the lower end of the main frame 71. The coupling part 22*b* is a plate-shaped part extending in the −Y direction from the bracket 22*a*. The right end portion of the contact plate 24 is attached to the coupling part 22*b* by means of the turning shaft 23. The protrusion 22*c* is a protruded part provided at the rear end portion of the coupling part 22*b*.

The turning shaft 23 turnably supports the contact plate 24 with respect to the coupling part 21*b* at the left end portion EL. Likewise, the turning shaft 23 turnably supports the contact plate 24 with respect to the coupling part 22*b* at the right end portion ER. In this manner, the contact plate 24 is turnably attached to the main frame 71 at the pair of the turning shafts 23. The lower end portion of the contact plate 24 is bent in the +Y direction. This portion is the contact part 24*a*.

The displacement detection unit 25 is provided at the left end portion EL of the height detection unit 20. The displacement detection unit 25 includes an arm 26 and a displacement sensor 27. The arm 26 is coupled to the contact plate 24 and extended in the −Y direction from the contact plate 24. The arm 26 is an example of the arm part of the present disclosure. The arm 26 may be formed integrally with the contact plate 24. The height detection unit 20 includes the arm 26, and the contact plate 24 and the contact part 24*a* fixed or coupled to one end of the arm 26. The arm 26 is turnably coupled to the movement unit 70. The contact part 24*a* is provided at an end of the contact plate 24 on the substantially lower side.

The displacement sensor 27 is attached to the coupling part 21*b*. An arm tip end portion 26*a*, which is the tip end of the arm 26, is bent toward the displacement sensor 27.

When the contact plate 24 makes contact with the medium M or the table 31 while the main frame 71 moves forward or rearward, the contact plate 24 turns about the turning shaft 23. At this time, the arm 26 is displaced along with the turn of the contact plate 24. The displacement sensor 27 detects displacement of the arm 26.

FIGS. 3 and 4 illustrate a state where the contact plate 24 is not in contact with the medium M and the table 31. This state is referred to as normal state. The position of the contact plate 24 and the arm 26 in the normal state is a non-contact state position.

As illustrated in FIG. 4, the contact plate 24 is provided with a spring supporting part 28 at the right end portion ER. The spring supporting part 28 is a member coupled to the contact plate 24 and extended in the −Y direction from the contact plate 24. The spring supporting part 28 may be integrated with the contact plate 24. A hole is provided in the spring supporting part 28, and a spring 29 is attached between the hole and the protrusion 22*c*. The spring 29 is a tension coil spring, and applies to the spring supporting part 28 a tensile force toward the protrusion 22*c*.

The spring 29 is an example of an elastic member that applies to the spring supporting part 28 a tensile force toward the rear side of the recording apparatus 1. The spring 29 may be replaced with an elastic member such as a rubber.

The spring 29 applies to the spring supporting part 28 a tensile force toward the protrusion 22*c*. The spring supporting part 28 is closest to the protrusion 22*c* in the normal state where the contact plate 24 is not in contact with the medium M and the table 31, at the non-contact state position. When the contact plate 24 turns from the non-contact state position, the tensile force of the spring 29 acts in the direction of resetting the contact plate 24 to the normal state. In this manner, the spring 29 has an operational effect to maintain the contact plate 24 at the non-contact state position and an operational effect to reset the contact plate 24 to the non-contact state position when the contact plate 24 turns.

The displacement sensor 27 of the displacement detection unit 25 detects contact and non-contact between the contact part 24*a* and the medium M or the table 31. The displacement sensor 27 needs only to be a sensor that can detect a displacement of the arm 26 from the non-contact state position. Examples of the displacement sensor 27 include magnetic sensors, reflection-type optical sensors, and transmission-type optical sensors.

Note that since sensors using laser are likely to increase the cost, it is preferable to use other sensors. In addition, known technology employs a displacement sensor for detecting the turning amount. The displacement sensor has a configuration including a rotary scale and a detector. Regarding the rotary scale, there are concerns about detection faults due to adhesion of dust and ink mist in addition to increase in cost. In view of this, the displacement detection unit 25 reduces the cost with a simple configuration, and maintains the favorable detection performance.

As illustrated in FIGS. 3 and 5, in this embodiment, a transmission-type optical sensor is employed as the displacement sensor 27. The displacement sensor 27 includes a light emission unit 27*a* and a light reception unit 27*b*. The light emission unit 27*a* includes a light source such as an LED (light Emitting Diode), and emits light toward the light reception unit 27*b*. The light reception unit 27*b* includes a light-receiving element, receives light emitted by the light emission unit 27*a*, and outputs a detection value corresponding to the quantity of the received light. Here, the path of the light emitted by the light emission unit 27*a* is referred to as light path L.

A space for the arm tip end portion 26*a* to enter and exit is provided between the light emission unit 27*a* and the light reception unit 27*b*. At the non-contact state position, the arm tip end portion 26*a* is located between the light emission unit 27*a* and the light reception unit 27*b* to block the light path L. When the contact plate 24 turns by making contact with the medium M or the table 31, the arm 26 turns together with the contact plate 24, for example. Then, when the arm tip end portion 26*a* is deviated from the light path L due to the turn of the arm 26, the quantity of light received by the light reception unit 27*b* increases.

The contact plate 24, the arm 26, and the spring supporting part 28 integrally turn about the turning shaft 23. Preferably, in the direction along the Y axis, the weights of the contact plate 24, the arm 26, and the spring supporting part 28 are adjusted such that they are horizontal in the normal state. Specifically, preferably, the mass of a portion MS1 on the +Y direction side of the center of the turning shaft 23 and the mass of a portion MS2 on the −Y direction side of the center of the turning shaft 23 are substantially the same as illustrated in FIG. 5.

In this case, when the contact plate 24 is not in contact with either the medium M or the table 31, the contact plate 24 and the arm 26 are advantageously stabilized at the non-contact state position. In addition, when the contact plate 24 makes contact with any of the medium M and the table 31, the contact plate 24 advantageously easily turns from the non-contact state position together with the arm 26.

Figure 6:
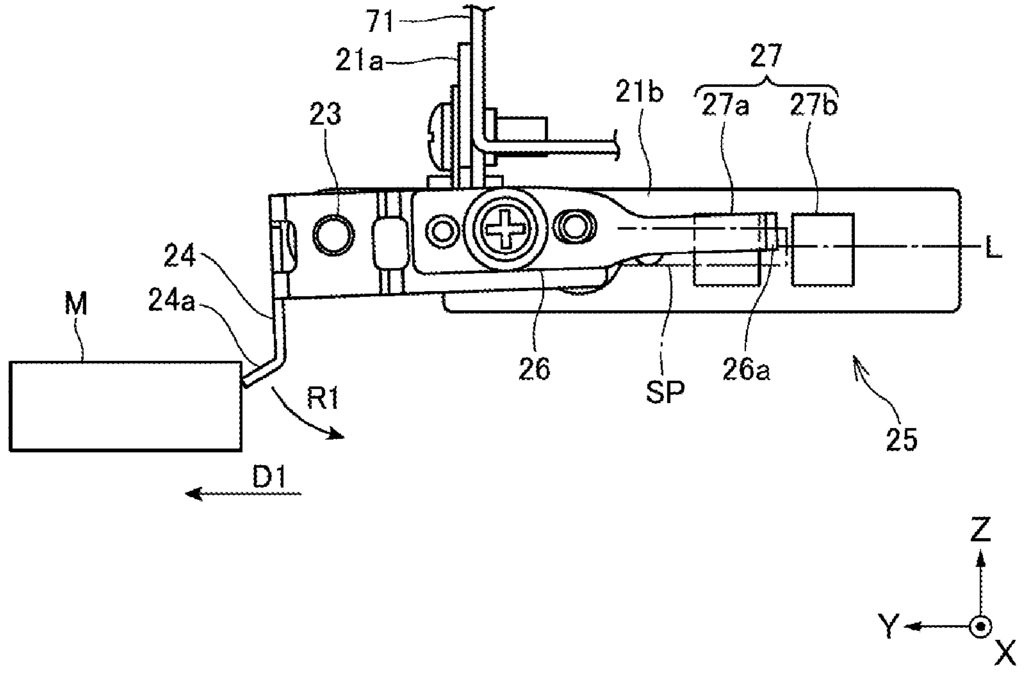
FIG. 6 is an explanatory diagram of a detection state of the height detection unit.
Figure 7:
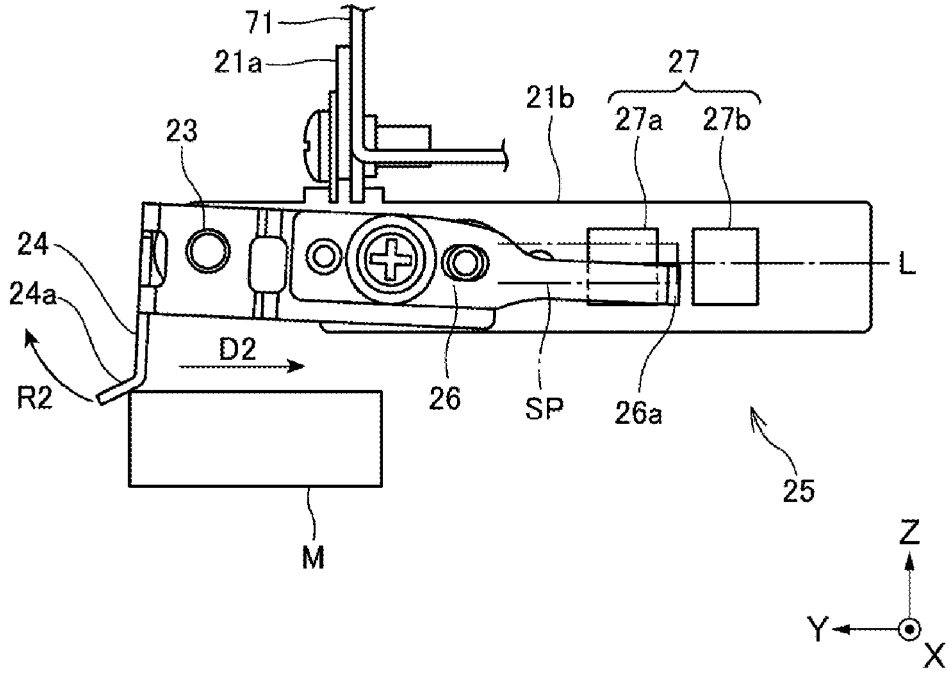
FIG. 7 is an explanatory diagram of a detection state of the height detection unit.
Figure 8:
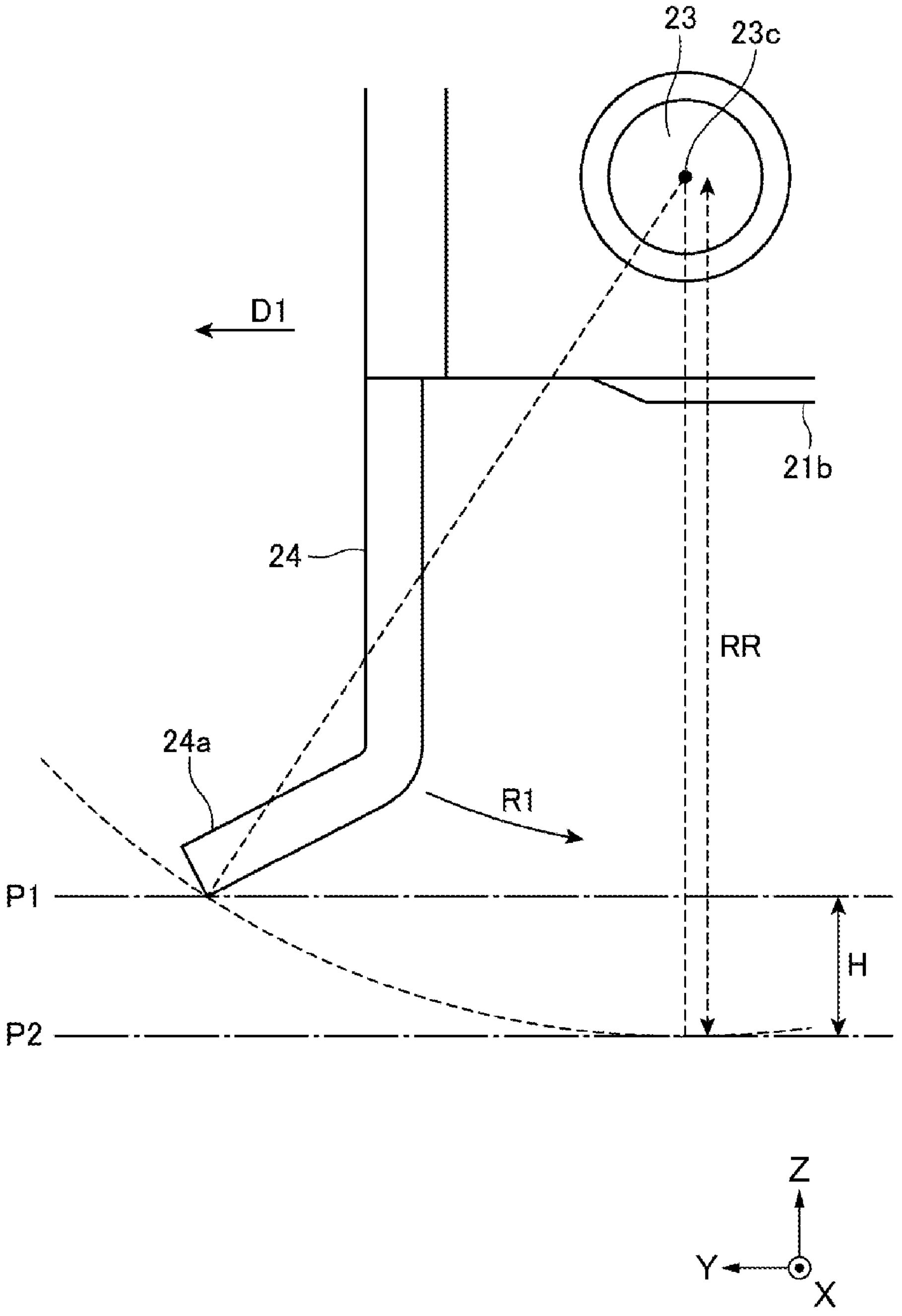
FIG. 8 is an explanatory diagram illustrating a movement of a contact plate in the detection state of the height detection unit.

FIGS. 6 and 7 are explanatory diagrams of a detection state of the height detection unit 20. FIG. 8 is an explanatory diagram illustrating a movement of the contact plate 24 in a detection state of the height detection unit 20. FIGS. 6 and 7 illustrate a state where the contact plate 24 makes contact with the medium M while the movement unit 70 moves. In FIG. 6, the movement direction of the movement unit 70 corresponds to a D1 direction. The D1 direction is the +Y direction. In FIG. 7, the movement direction of the movement unit 70 is a D2 direction. The D2 direction corresponds to the −Y direction.

In the state illustrated in FIG. 6, the contact part 24*a* makes contact with the medium M from the rear side of the medium M. When the movement unit 70 moves in the D1 direction from the state of FIG. 6, the contact part 24*a* makes contact with the medium M, and as a result the contact plate 24 turns in a rotational direction R1 around the turning shaft 23. The rotational direction R1 is the downward and rearward direction of the contact plate 24.

In the state illustrated in FIG. 7, the contact part 24*a* makes contact with the medium M from the front side of the medium M. When the movement unit 70 moves in the D2 direction from the state of FIG. 7, the contact part 24*a* makes contact with the medium M, and the contact plate 24 turns in a rotational direction R2 around the turning shaft 23. The rotational direction R2 is the upward and forward direction of the contact plate 24.

In each of the states of FIGS. 6 and 7, when the movement unit 70 continues the movement, the arm 26 is displaced and deviated from the light path L. In this manner, the displacement sensor 27 detects a turn of the contact plate 24. Specifically, the displacement detection unit 25 detects contact and non-contact between the contact part 24*a* and the medium M or the table 31 on the basis of the turn of the arm 26. In the direction along the Z axis, the position of the medium M is calculated from the position of the medium supporting part 31*m* at the time when the contact part 24*a* makes contact with the medium M. The above-mentioned position of the medium supporting part 31*m* is detected by a table location sensor described later, and the control unit calculates the position of the medium M along the Z axis. In this manner, the height as the position of the medium M in the direction along the Z axis is measured, and the recording gap can be adjusted.

Here, when the contact between the contact part 24*a* and the medium M is slight, displacement of the arm 26 is also slight. In this case, the arm 26 does not deviate from the light path L, and the displacement detection unit 25 does not detect the contact. Such a slight contact that does not block the light path L, i.e., the light shielding state of the light path L with a slight contact is used in a secondary detection described later. Note that in this specification, a contact with which no contact is detected by the displacement detection unit 25 is referred to as slight contact, a contact with which the contact is detected is simply referred to as contact for discrimination.

As illustrated in FIG. 6, when the contact plate 24 makes contact with the medium M while the movement unit 70 moves in the D1 direction, the contact part 24*a* moves down along with the turn of the contact plate 24. The amount of this downward movement is described below with reference to FIG. 8.

In FIG. 8, the axis center of the turning shaft 23 is used as a rotation center 23*c*. The rotation center 23*c* is the center of the turn of the contact plate 24. Here, the positions of the lower end of the contact part 24*a* in the direction along the Z axis are positions P1 and P2. The position P1 is the position of the contact part 24*a* in the normal state, and is the non-contact state position. The position P2 is the lowest position in the turning range of the contact part 24*a*. The difference between the position P1 and the position P2 is set as a height H. The value of the height H is determined by the radius of rotation of the tip end of the contact part 24*a* represented by the reference numeral RR in FIG. 8.

The contact part 24*a* turns about the turning shaft 23 by making contact with the medium M or the table 31 while the movement unit 70 moves in the D1 direction. In this manner, the contact part 24*a* moves down by the height H. At this time, in the case where the contact part 24*a* and the table 31 are close to each other, the contact part 24*a* may make contact with the table 31 or the medium M when the contact part 24*a* turns. When the movement unit 70 further moves in the D1 direction from this state, the contact part 24*a* may be caught by the top surface of the table 31 or the medium M.

In view of this, the recording apparatus 1 ensures a gap equal to or greater than the height H between the contact part 24*a* and the table 31 when the movement unit 70 moves in the D1 direction as described later. In this manner, a situation where the contact part 24*a* is caught by the top surface of the table 31 or the medium M can be avoided.

Figure 9:
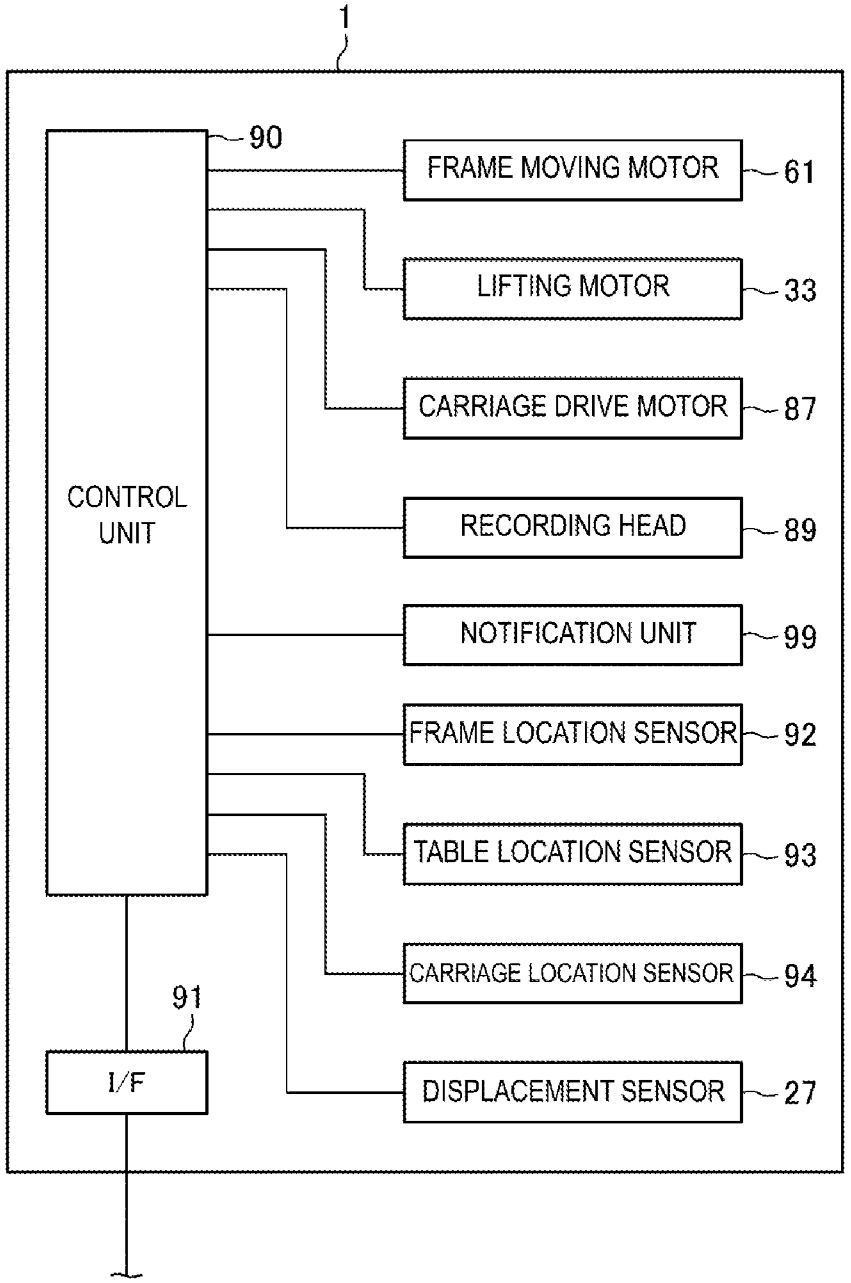
FIG. 9 is a block diagram of a recording apparatus.

FIG. 9 is a block diagram illustrating a functional configuration of a control system of the recording apparatus 1. The control unit 90 includes a processor such as a CPU (Central Processing Unit) and a MPU (Micro Processing Unit), and a storage unit. The storage unit of the control unit 90 includes a volatile memory and a nonvolatile storage. The volatile memory is, for example, a RAM (random access memory). The nonvolatile storage is composed of a ROM (read only memory), a hard disk, a flash memory or the like. The control unit 90 integrally controls each unit of the recording apparatus 1 by executing the program stored in the storage unit.

The control unit 90 is coupled to an interface (I/F) 91. The interface 91 is a communication apparatus that executes a wired communication using a cable, or a radio communication using a wireless communication line. The interface 91 receives recording data by executing communications with a host computer not illustrated in the drawing. The recording data includes data of images and letters to be recorded on the medium M by the recording apparatus 1, a command that instructs an operation of the recording apparatus 1, and other data.

The control unit 90 is electrically coupled to the lifting motor 33, the frame moving motor 61, the carriage drive motor 87, and the recording head 89. The control unit 90 is also electrically coupled to a frame location sensor 92, a table location sensor 93, a carriage location sensor 94, and the displacement sensor 27.

The frame location sensor 92 detects the position of the main frame 71 in the direction along the Y axis. For example, the frame location sensor 92 is a linear encoder disposed along the first guide shaft 51*a*.

The table location sensor 93 detects the position of the table 31 in the Z axis. The table location sensor 93 is, for example, a rotary encoder that detects the rotation amount of the lifting motor 33, or a rotary encoder that detects the rotation amount of the ball screw of the lifting mechanism 39.

The carriage location sensor 94 detects the position of the carriage 88 in the direction along the X axis. For example, the carriage location sensor 94 is a linear encoder disposed along the carriage guide shaft 83.

The control unit 90 specifies the position of the main frame 71, the position of the table 31, and the position of the carriage 88 on the basis of the detection values of the frame location sensor 92, the table location sensor 93, and the carriage location sensor 94.

The control unit 90 operates each motor on the basis of the recording data received by the interface 91. Specifically, the control unit 90 moves the movement unit 70 along the Y axis by controlling the switching of the rotational direction of the frame moving motor 61, and the start and stop of the rotation of the frame moving motor 61. The control unit 90 moves the table 31 along the Z axis by controlling the switching of the rotational direction of the lifting motor 33, and the start and stop of the rotation of the lifting motor 33. The control unit 90 moves the carriage 88 along the X axis by controlling the switching of the carriage drive motor 87, and the start and stop of the rotation of the carriage drive motor 87. In these controls, the control unit 90 uses the detection values of the frame location sensor 92, the table location sensor 93, and the carriage location sensor 94.

The control unit 90 operates the recording head 89 to eject liquid on the basis of the recording data received by the interface 91.

The control unit 90 adjusts the recording gap in the state where the medium M is placed on the table 31. The control unit 90 moves the main frame 71 in the D1 direction or the D2 direction by operating the frame moving motor 61. The control unit 90 determines whether the contact plate 24 has made contact with the medium M or the table 31 by determining whether the arm 26 has been displaced on the basis of the detection value of the displacement sensor 27. When it is determined that the contact plate 24 has made contact with the medium M or the table 31, the control unit 90 moves down the table 31 by operating the lifting motor 33.

A notification unit 99 is electrically coupled to the control unit 90. The notification unit 99 is a display panel installed at the exterior housing of the recording apparatus 1, for example. In the notification unit 99, various information about the recording apparatus 1 is displayed and notified to the user. Specifically, the control unit 90 provides a notification of the detection result of the height of the medium M executed by the height detection unit 20 to the user through the notification unit 99. In this manner, the convenience of the user is improved. Note that the notification unit 99 is not limited to a display panel, and may provide the notification of the detection result with a sound or the like.

Details of the height detection of the medium M are described below with reference to FIGS. 10 to 30. The control unit 90 causes the height detection unit 20 to perform fault detection, the primary detection as height detection, and the secondary detection subsequent to the primary detection. In the primary detection, a rough height of the medium M on the medium supporting part 31*m* is detected. In the secondary detection, the specific height of the medium M on the medium supporting part 31*m* is detected.

Here, a feature of the recording method performed with the recording apparatus 1 of this embodiment is the fault detection and the height detection. Publicly known recording methods may be applied for the other recording method than the fault detection and the height detection, and the description of the other recording method will be omitted. Note that the procedure of the detection described below is an example, and is not limitative.

Here, in the schematic plan views and the schematic side views in FIGS. 10 to 30, only the main part is illustrated, and the illustration of other configurations is omitted. For the schematic side views, a state as viewed from the −X direction side is described unless otherwise noted. In addition, in the above-mentioned schematic side view, the lower end position of the contact part 24*a* in the direction along the Z axis is indicated by the broken line. Here, the position of the lower end of the contact part 24*a* in the direction along the Z axis may change due to the contact with the medium M and/or the table 31. As such, the lower end of the contact part 24*a* and the broken line in the illustration may not necessarily overlap each other. Further, in the flow charts in FIGS. 10 to 30, the above-described recording gap is represented by “PG”, and the contact part 24*a* is represented by “sensor”.

Preferably, the fault detection is performed prior to the primary detection of the height detection to confirm the defect of the height detection unit 20. Examples of the defect of the height detection unit 20 include deformation of the arm 26 and abnormality of the displacement sensor 27. In this manner, the fault of the height detection unit 20 can be ascertained in advance, the convenience of the user can be improved.

The control unit 90 adjusts the position of the table 31 to the reference position on the basis of the detection value of the table location sensor 93 by operating the lifting motor 33. The reference position of the table 31 is a height set in advance, and is the position of the table 31 in the Z axis with which an appropriate recording gap is ensured in the case where the medium M is a sheet, for example.

Figure 10:
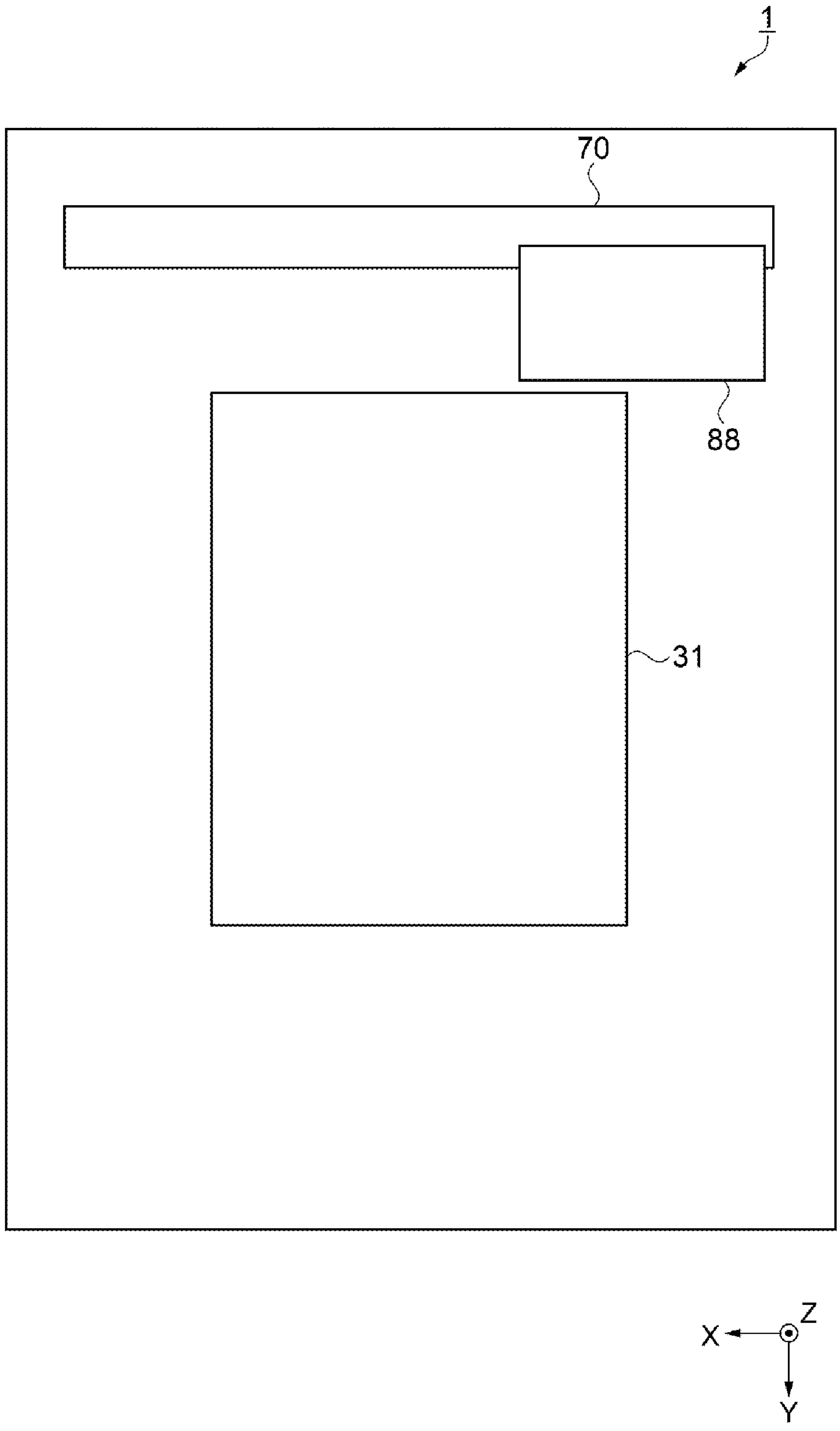
FIG. 10 is a schematic plan view illustrating a home position of a movement unit, a carriage, and a table.

The fault detection is described below. The fault detection is started from the following reference position and home position. As illustrated in FIG. 10, the control unit 90 adjusts the height of the table 31 to the above-mentioned reference position, and moves the movement unit 70 in the −Y direction and the carriage 88 in the −X direction. In plan view from the +Z direction, the position of the movement unit 70 and the carriage 88 illustrated in FIG. 10 is the home position.

Figure 11:
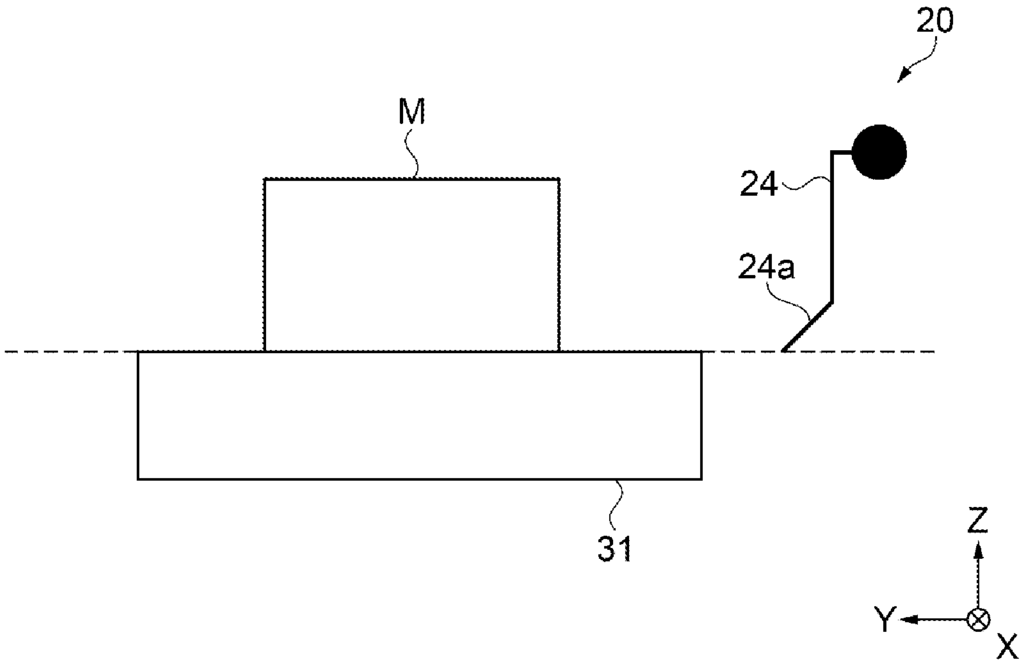
FIG. 11 is a schematic side view illustrating a reference position of the movement unit and the detection unit with respect to the table.

FIG. 11 illustrates an arrangement of the table 31 and the height detection unit 20 at the reference position and the home position. At this time, in a side view from the −Y direction, the contact part 24*a* and the table 31 are close to each other without overlapping each other. Note that the fault detection may be started from the secondary detection start position described later.

Figure 12:
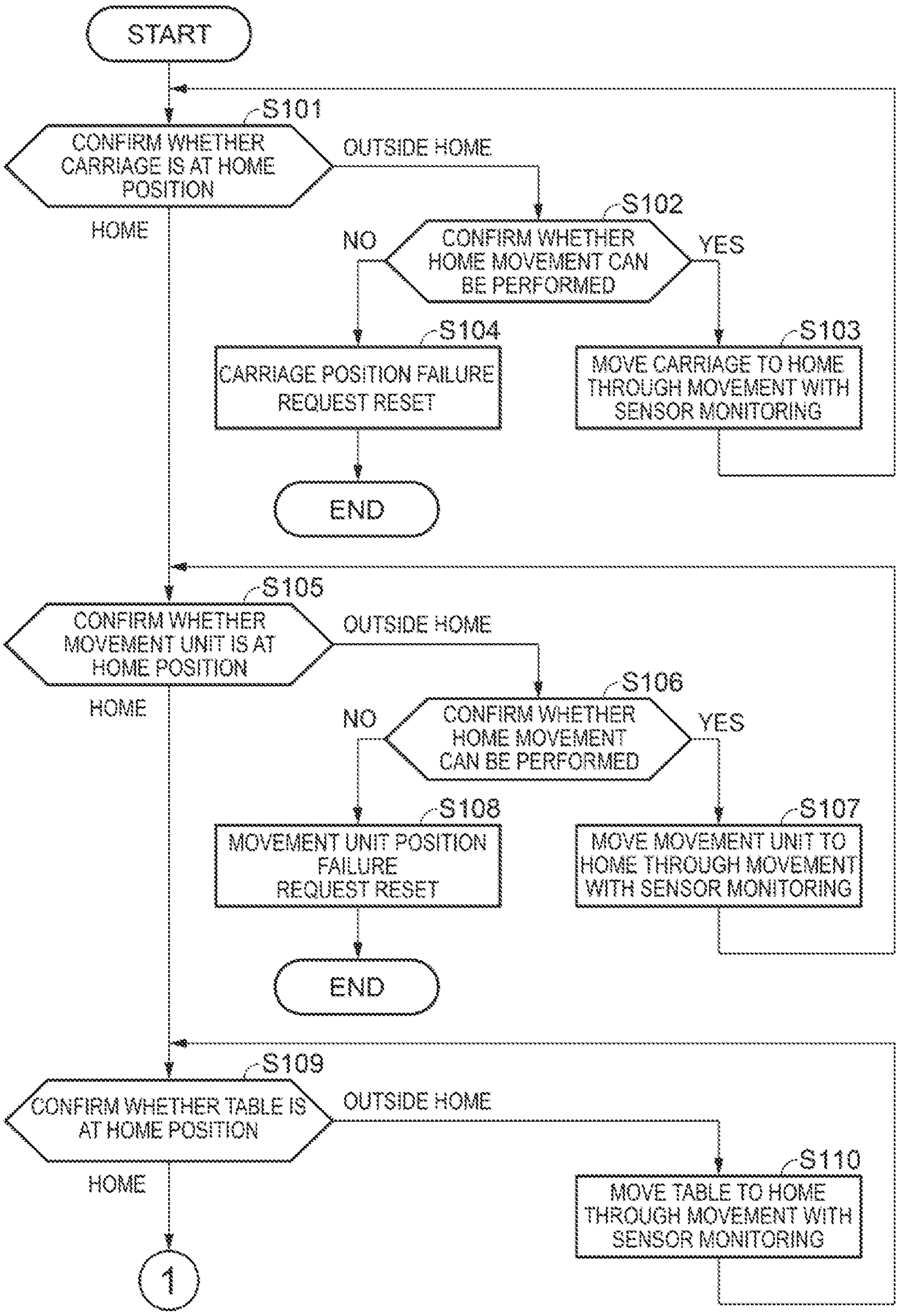
FIG. 12 is a flow chart illustrating an operation of a fault detection and a primary detection.

Prior to the fault detection, a preparation for the fault detection and the height detection is performed. More specifically, as illustrated in FIG. 12, the start position of the height detection is adjusted by performing steps S101 to S110.

First, step S101 is performed after the user has set the medium M at the table 31. At step S101, whether the carriage 88 is located at the home position is confirmed. When the carriage 88 is located at the home position, the process proceeds to step S105. When the carriage 88 is not located at the home position, i.e., it is located outside the home, the process proceeds to step S102. Note that step S101 may be automatically started in accordance with an instruction of the user to start the recording, or may be started by an instruction of the user before the start of the recording.

At step S102, the user is asked whether the carriage 88 can be moved to the home position. Step S102 is performed to prevent the damage to the medium M due to the contact between the medium M on the medium supporting part 31*m* of the table 31 and the contact part 24*a* that moves together with the carriage 88. When the user determines that it can be moved and inputs it into the recording apparatus 1 (YES), the process proceeds to step S103. When the user determines that it cannot be moved and inputs it into the recording apparatus 1 (NO), the process proceeds to step S104.

At step S103, the carriage 88 moves to the home position along with the movement of the movement unit 70. This movement is a movement with sensor monitoring. The movement with sensor monitoring means a movement of the movement unit 70 while monitoring the contact of the medium M and the contact part 24*a* with the height detection unit 20. Then, the process returns to the preceding stage of step S101.

At step S104, due to a position failure of the carriage 88, the user is requested to reset the medium M. In this case, the user is requested to reset the medium M at the table 31. The recording apparatus 1 is set to the standby state, and the step is temporarily terminated.

When the reset of the medium M is requested, the user removes the medium M from the table 31 after opening the cover of the table 31. Thereafter, the medium M is set to the table 31 again after performing the resetting operation of the recording apparatus 1. Then, the process is performed again from the preceding stage of step S101. Here, when the carriage 88 is located outside the home at step S101, the process may directly proceed to step S104 without proceeding to step S102.

At step S105, whether the movement unit 70 is located at the home position is confirmed. When the movement unit 70 is located at the home position, the process proceeds to step S109. When the movement unit 70 is not located at the home position, i.e., it is located outside the home, the process proceeds to step S106.

At step S106, the user is asked whether the movement unit 70 can be moved to the home position. As at step S102, step S106 is performed to prevent the damage to the medium M due to the contact between the medium M on the table 31 and the contact part 24*a* that moves together with the carriage 88. When the user determines that it can be moved and inputs it into the recording apparatus 1 (YES), the process proceeds to step S107. When the user determines that it cannot be moved and inputs it into the recording apparatus 1 (NO), the process proceeds to step S108.

At step S107, the movement unit 70 moves to the home position. This movement is a movement with sensor monitoring. Then, the process returns to the succeeding stage of step S101 and the preceding stage of step S105.

At step S108, due to a position failure of the movement unit 70, the user is requested to reset the medium M. In this case, the user is requested to reset the medium M at the table 31. The recording apparatus 1 is set to the standby state, and the step is temporarily terminated.

When the reset of the medium M is requested, the user removes the medium M from the table 31 after opening the cover of the table 31. Thereafter, the medium M is set to the table 31 again after performing the resetting operation of the recording apparatus 1. Then, step S105 is performed again from the preceding stage of step S105. Here, when the movement unit 70 is located outside the home at step S105, the process may directly proceed to step S108 without proceeding to step S106.

At step S109, whether the table 31 is located at the home position is confirmed. When the table 31 is located at the home position, the process proceeds to step S111 illustrated in FIG. 13. When the table 31 is not located at the home position, i.e., it is located outside the home, the process proceeds to step S110.

At step S110, the table 31 is moved up to the home position. This movement is a movement with sensor monitoring. Here, the movement of the table 31 at step S110 is a movement along the Z axis, and the above-described movement of the movement unit 70 is a movement along the Y axis. Then, the process returns to the succeeding stage of step S105 and the preceding stage of step S109.

Figure 13:
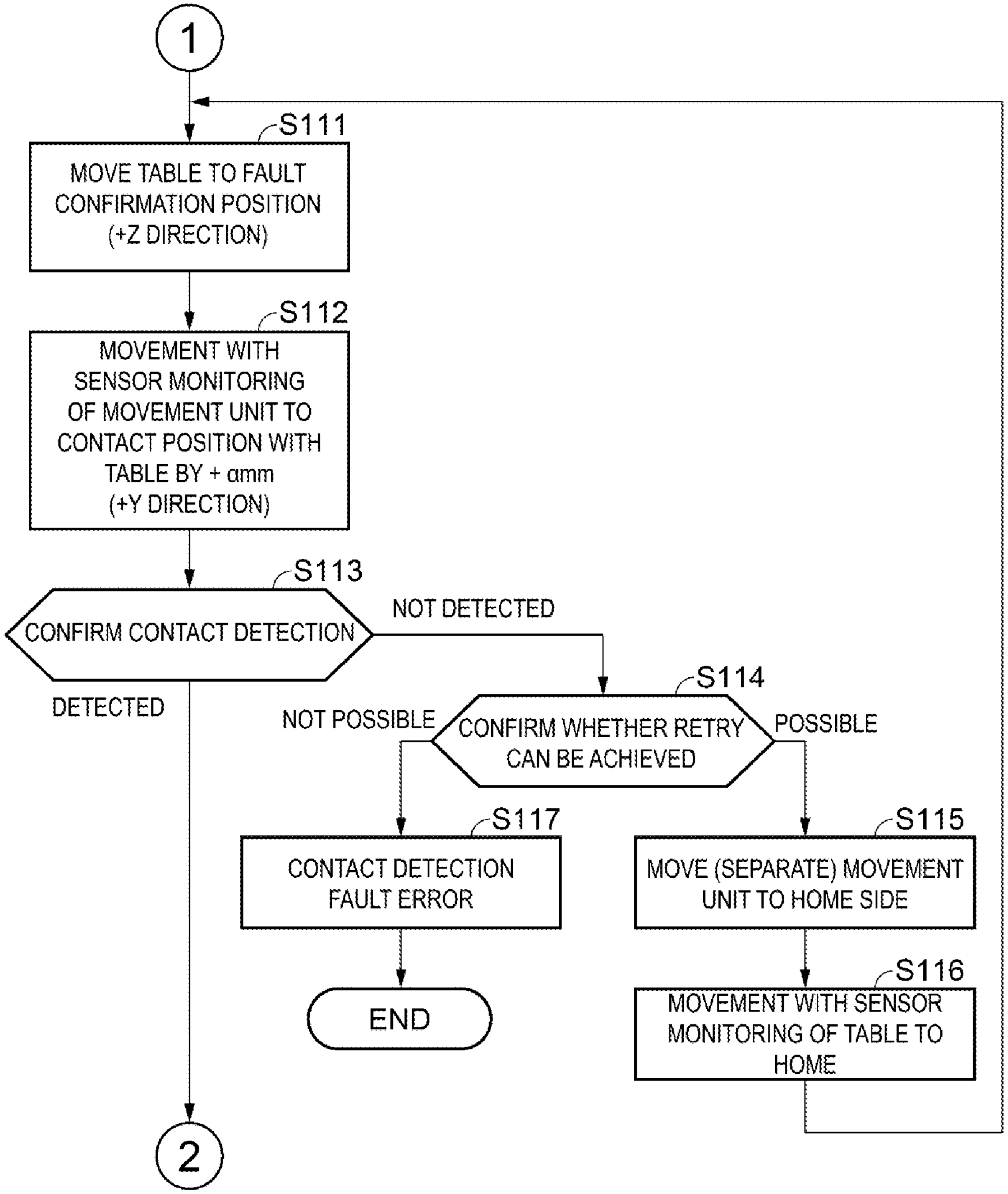
FIG. 13 is a flow chart illustrating an operation of the fault detection and the primary detection.

Next, the fault detection is performed. More specifically, as illustrated in FIG. 13, the fault detection is performed through steps S111 to S117.

Figure 15:
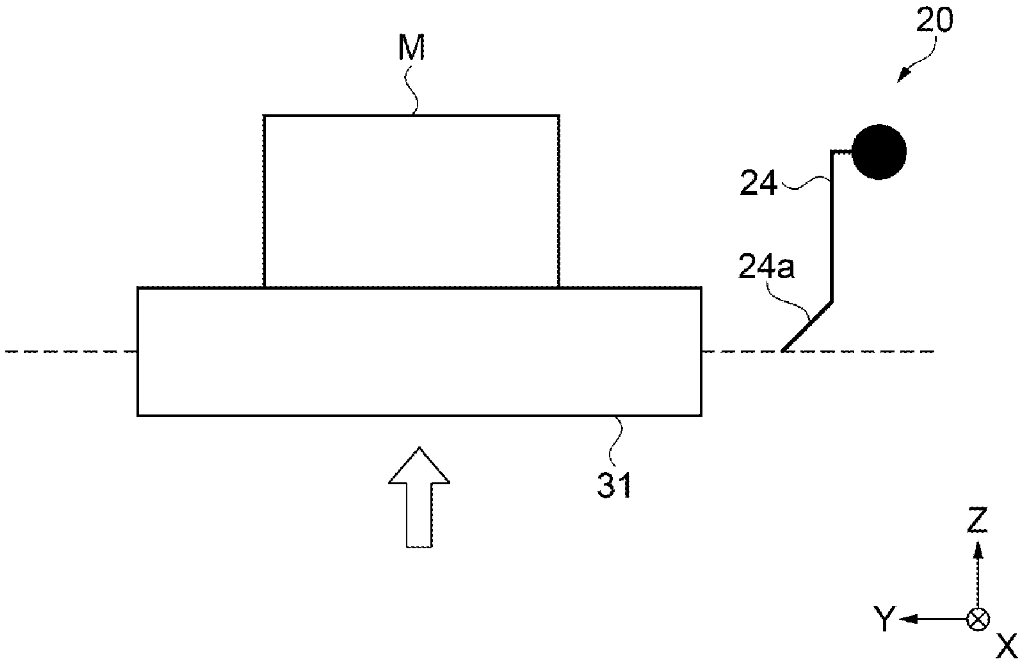
FIG. 15 is a schematic side view illustrating an operation of the fault detection.

At step S111, the table 31 is moved up to a fault confirmation position. This state is illustrated in FIG. 15. The fault confirmation position is a position in the direction along the Z axis, and is a position where the contact part 24*a* and the side surface of the table 31 overlap each other in a side view from the −Y direction. The fault confirmation position is stored in advance in the storage unit of the control unit 90. Then the process proceeds to step S112.

At step S112, the movement unit 70 is moved in the +Y direction through the movement with sensor monitoring such that the table 31 and the contact part 24*a* make contact with each other. The movement of the movement unit 70 in the +Y direction at step S112 is a further movement in the +Y direction by +α mm with respect to the position where the side surface of the table 31 in the −Y direction and the contact part 24*a* make contact with each other. Here, +α mm is 0.1 mm to 5.0 mm, for example. Then the process proceeds to step S113.

Figure 16:
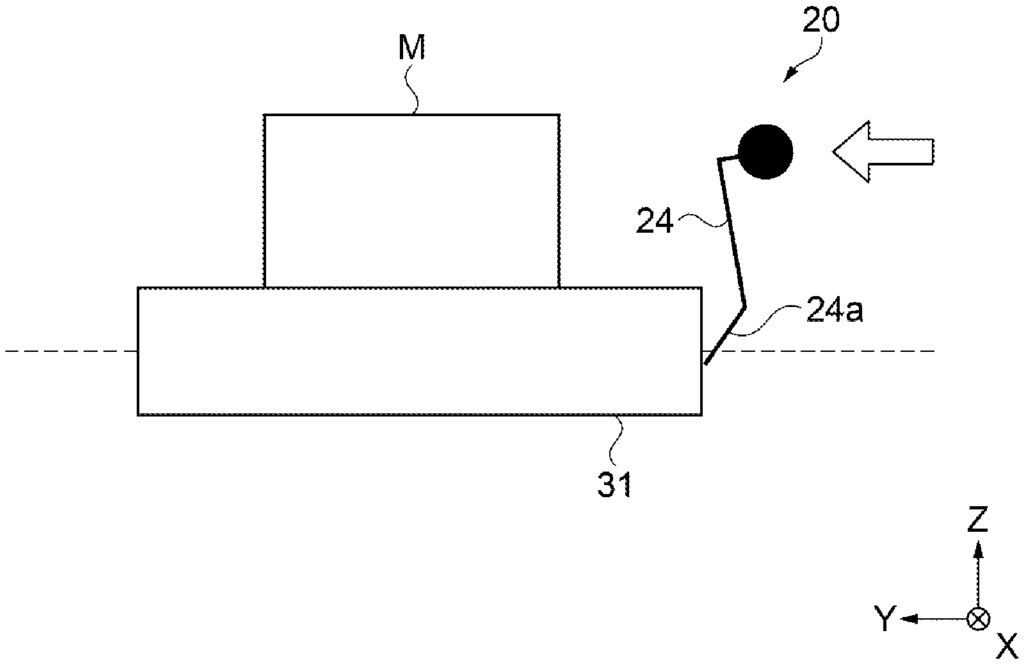
FIG. 16 is a schematic side view illustrating an operation of the fault detection.

At step S113, whether a contact between the contact part 24*a* and the table 31 has been detected is confirmed. As illustrated in FIG. 16, when a contact has been detected, the control unit 90 determines that position. Then, the control unit 90 determines whether the moving length of the movement unit 70 from the home position is within the movement amount stored in advance at the time of their contact. When it is within the predetermined movement amount, it is determined that there is no problem in the height detection unit 20. This determination result is notified to the user through the above-described notification unit 99. In this manner, the fault detection is completed, and the process proceeds to step S118 illustrated in FIG. 14.

When the movement exceeds the predetermined movement amount, or when no contact can be detected, it is assumed that there is a fault or defect of the height detection unit 20 or the like, a problem of the movement of the table 31 to the home position, a failure of movement of the movement unit 70, generation of chattering at the contact part 24*a* and the like. When the contact between the contact part 24*a* and the side surface of the table 31 cannot be detected, the process proceeds to step S114.

At step S114, whether a retry of the fault detection can be performed is confirmed. There are multiple factors of a situation where a contact between the contact part 24*a* and the table 31 is not detected, as described above. Therefore, a retry of the fault detection is performed instead of immediately determining that an error has occurred. When a retry can be performed, the process proceeds to step S115. When a retry cannot be performed, the process proceeds to step S117.

At step S115, the movement unit 70 is moved to the home side in the −Y direction. In this manner, the contact part 24*a* and the table 31 are further separated. Then the process proceeds to step S116.

At step S116, the table 31 is moved to the home position. This movement is a movement with sensor monitoring. Then the process returns to the succeeding stage of step S110 and the preceding stage of step S111. Note that preferably, in the procedure of the retry of the fault detection returned from step S116, the speed of the movement of the movement unit 70 in the +Y direction is lower than the speed of the initial movement at step S112 subsequent from step S111.

At step S117, a contact detection fault error, i.e., occurrence of a fault is recognized in the fault detection. In this case, the concern about the fault is notified to the user through the notification unit 99, and the recording apparatus 1 is set to the standby state and temporarily terminated. Thus, the fault detection is completed.

Figure 14:
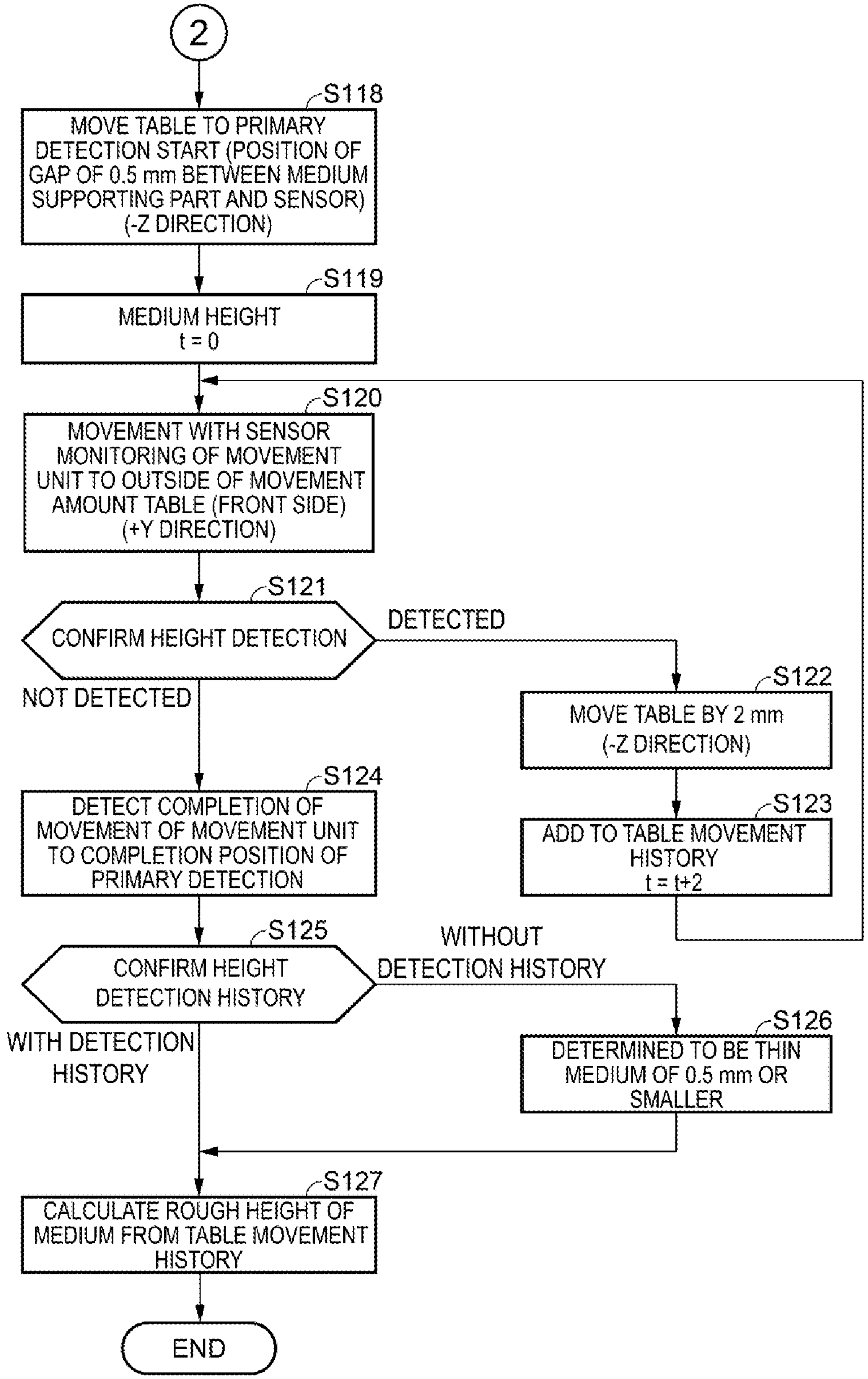
FIG. 14 is a flow chart illustrating an operation of the fault detection and the primary detection.

The primary detection is described below. The primary detection is performed following the fault detection. In the primary detection, while moving the contact part 24*a* in the +Y direction along the Y axis, the displacement detection unit 25 detects the contact and non-contact between the contact part 24*a* and the medium M. When the above-mentioned contact is confirmed, the movement in the +Y direction is interrupted. Then, after the medium supporting part 31*m* of the table 31 is separated by a first distance with respect to the movement unit 70 along the Z axis, the movement of the movement unit 70 in the +Y direction is restarted. More specifically, as illustrated in FIG. 14, steps S118 to S127 are performed as the primary detection.

In the movement with sensor monitoring of the primary detection, the movement unit 70 moves in the +Y direction at a first speed. In addition, in the movement with sensor monitoring of the secondary detection described later, the movement unit 70 moves in the −Y direction at a second speed. The first speed is higher than the second speed. The first speed and the second speed are, but not limited to, 2 inch/second and 1 inch/second, for example.

In the primary detection, the first speed, which is a relatively high speed, is applied because it suffices to detect a rough height of the medium M. In this manner, the time required for the primary detection can be further shortened. In the secondary detection, the second speed, which is a relatively low speed, is applied to detect the specific height of the medium M. In this manner, the accuracy of the secondary detection can be improved.

Figure 17:
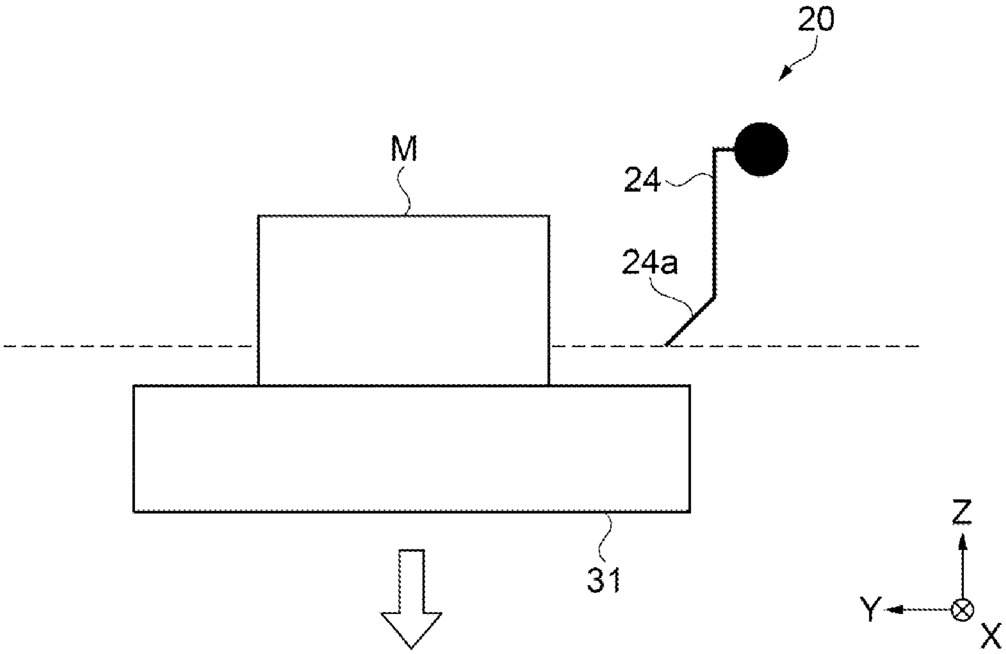
FIG. 17 is a schematic side view illustrating an operation of the fault detection.
Figure 18:
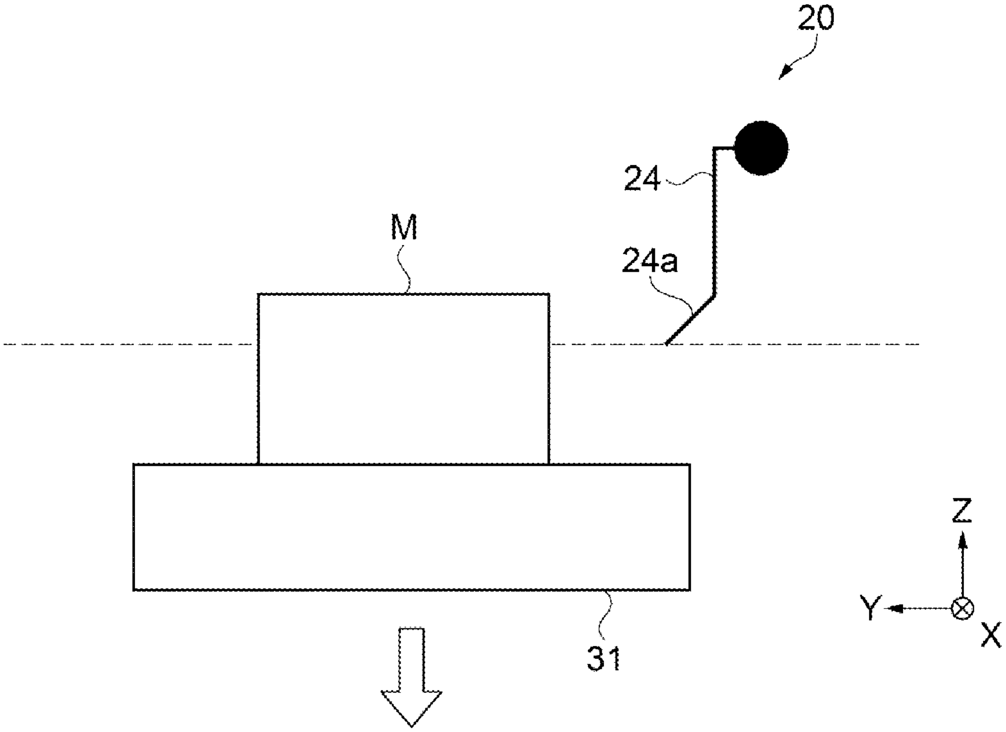
FIG. 18 is a schematic side view illustrating an operation of the fault detection.

At step S118 and subsequent step S119, the table 31 is moved down to perform the primary detection. More specifically, as step S118, the table 31 is moved down to the start position of the primary detection as illustrated in FIG. 17. The primary detection start position is a position where the gap between the medium supporting part 31*m* and a sensor that is the contact part 24*a* is 0.5 mm. Next, at step S119, the table 31 is moved down to the position where the height of the medium M is zero as illustrated in FIG. 18. Step S119 is a step for handling a thin medium M. Then the process proceeds to step S120.

At step S120, the primary detection is started. More specifically, the movement unit 70 is moved in the +Y direction through the movement with sensor monitoring. Although not illustrated in the drawing, in plan view from the +Z direction, the movement of the movement unit 70 is a movement to a position where the movement unit 70 goes out in the +Y direction than the medium supporting part 31*m* of the table 31. Then the process proceeds to step S121.

Figure 19:
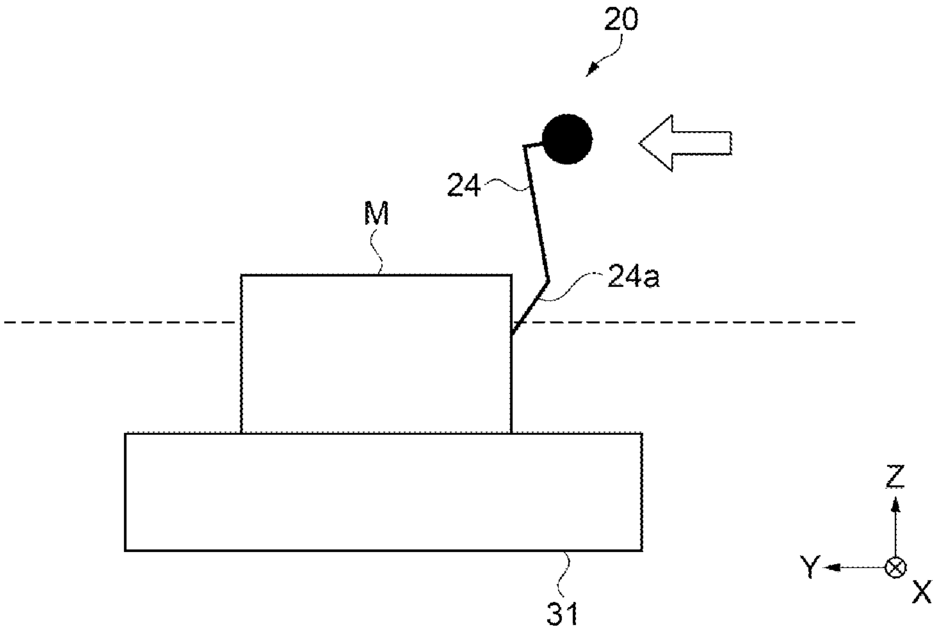
FIG. 19 is a schematic side view illustrating an operation of the primary detection.

At step S121, whether the contact of the medium M and the contact part 24*a* has been detected by the height detection unit 20 in the movement with sensor monitoring at step S120 is confirmed. As illustrated in FIG. 19, when the contact has been detected, the process proceeds to step S122. When no contact has been detected even when the movement unit 70 passes over the entire range of the medium M in plan view from the +Z direction, the process proceeds to step S124.

Figure 20:
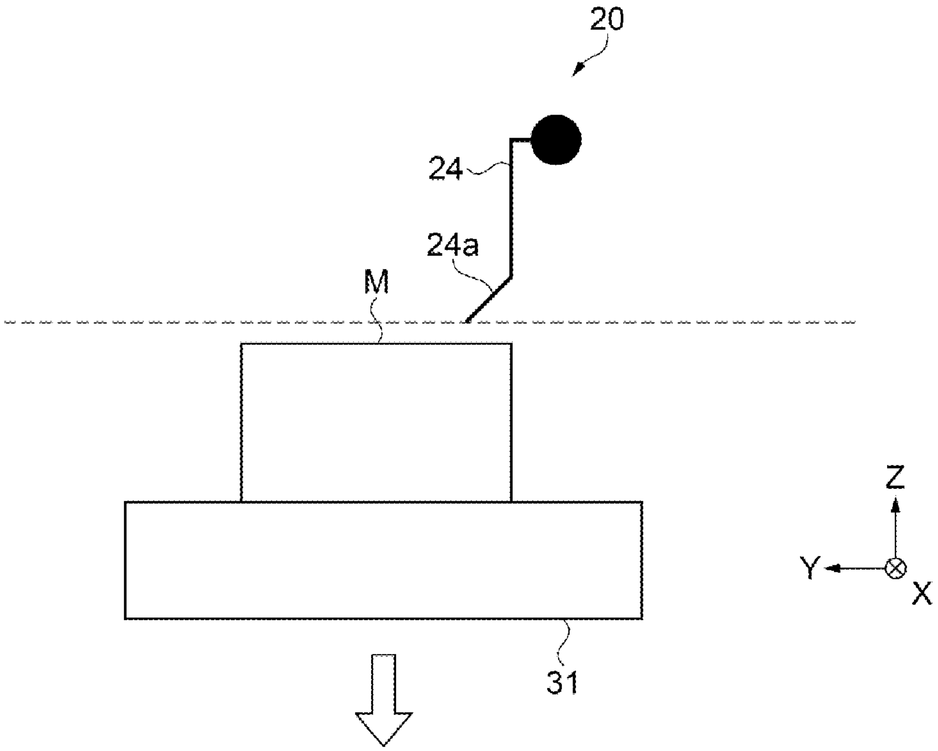
FIG. 20 is a schematic side view illustrating an operation of the primary detection.

At step S122, the movement of the movement unit 70 is stopped, and the table 31 is moved down as illustrated in FIG. 20. At this time, the table 31 is moved down by the first distance. The first distance is 2 mm, for example. At this time, to prevent generation of chattering at the contact part 24*a* due to the contact with the medium M, the movement of the table 31 at step S122 is not the movement with sensor monitoring. Then the process proceeds to step S123.

At step S123, the storage unit of the control unit 90 stores a result obtained by adding the first distance, here 2 mm, to the movement history of the table 31. Then the process is returned to step S120, and the primary detection is performed again. This procedure is repeated until the contact between the contact part 24*a* and the medium M is no longer detected at step S121, and the movement unit 70 passes through the entire range of the medium M in plan view from the +Z direction.

Figure 21:
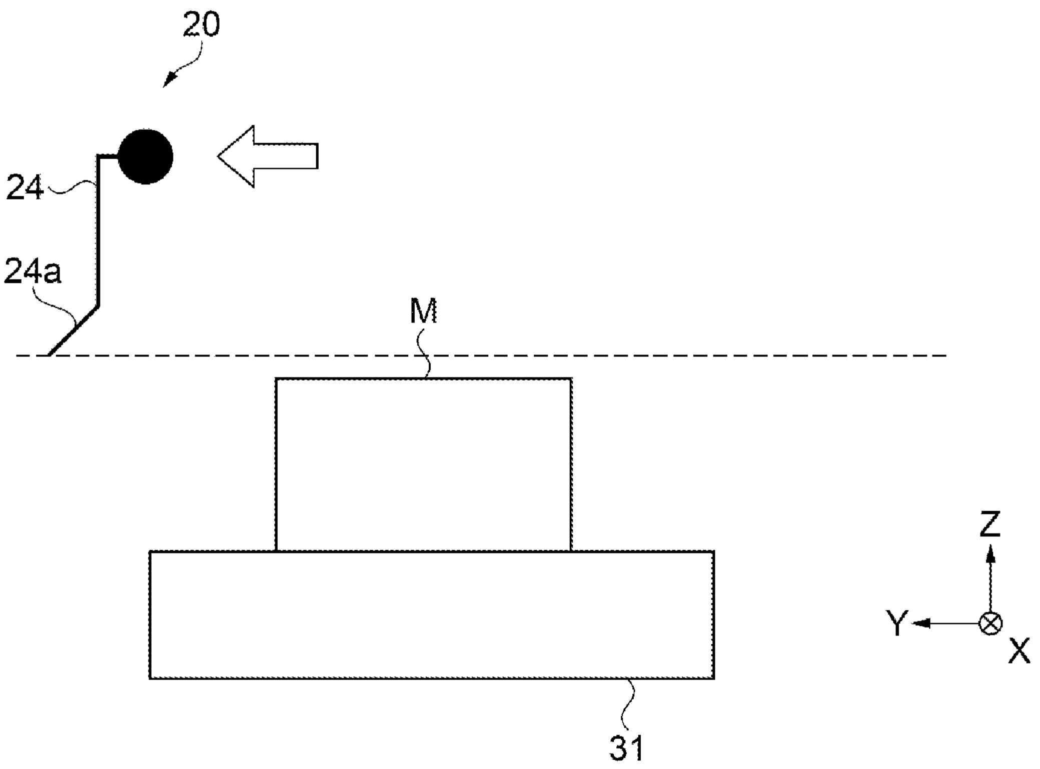
FIG. 21 is a schematic side view illustrating an operation of the primary detection.

At step S124, as illustrated in FIG. 21, the completion of the movement of the movement unit 70 to the completion position of the primary detection. The above-mentioned completion position is a position where the contact part 24*a* is on the +Y direction side than the table 31 in the direction along the Y axis. Then the process proceeds to step S125.

At step S125, the history of the height detection is confirmed. More specifically, whether the contact between the contact part 24*a* and the medium M has been detected in the height detection at step S121 is confirmed. The process proceeds to step S127 when there is a detection history of the contact, and the process proceeds to step S126 when there is no history of the contact detection.

At step S126, the medium M is determined to be thin with a thickness of 0.5 mm or smaller. Specifically, when the contact between the contact part 24*a* and the medium M is not detected in the primary detection and the movement of the movement unit 70 in the +Y direction is completed, the control unit 90 performs the secondary detection without performing the error determination. In this manner, the medium M is determined to be thin, and the process proceeds to step S127.

Here, publicly known techniques require time and labor to adjust the recording gap. In particular, in the case where the medium M is thin, it is difficult to set the height of the medium M, and failures may occur due to errors of the user. On the other hand, in the recording apparatus 1 and the recording method of the same of this embodiment, whether the medium M is thin is determined in the primary detection, and the height is precisely detected in the subsequent secondary detection. Since these steps automatically proceed, errors of the operator less occur, and the burden of the user is reduced.

At step S127, a rough height of the medium M is calculated. Specifically, a rough height of the upper end of the medium M is calculated from the position of the medium supporting part 31*m* of the table 31 along the Z axis at the time when the height detection unit 20 has detected the contact, i.e., the table movement history stored in the control unit 90. The control unit 90 notifies the detection result of the primary detection to the user through the above-described notification unit 99. Thus, the primary detection is completed.

The secondary detection is described below. The secondary detection is performed following the primary detection. In the secondary detection, the displacement detection unit 25 detects the contact and non-contact between the contact part 24*a* and the medium M while moving the contact part 24*a* in the −Y direction along the Y axis. When the above-mentioned contact is confirmed, the movement in the −Y direction is interrupted. Then, the movement of the movement unit 70 in the −Y direction is restarted after the medium supporting part 31*m* of the table 31 is separated from the movement unit 70 along the Z axis until the contact is not detected, i.e., the non-contact is detected. Note that the non-contact detected here includes the above-described slight contact.

Figure 22:
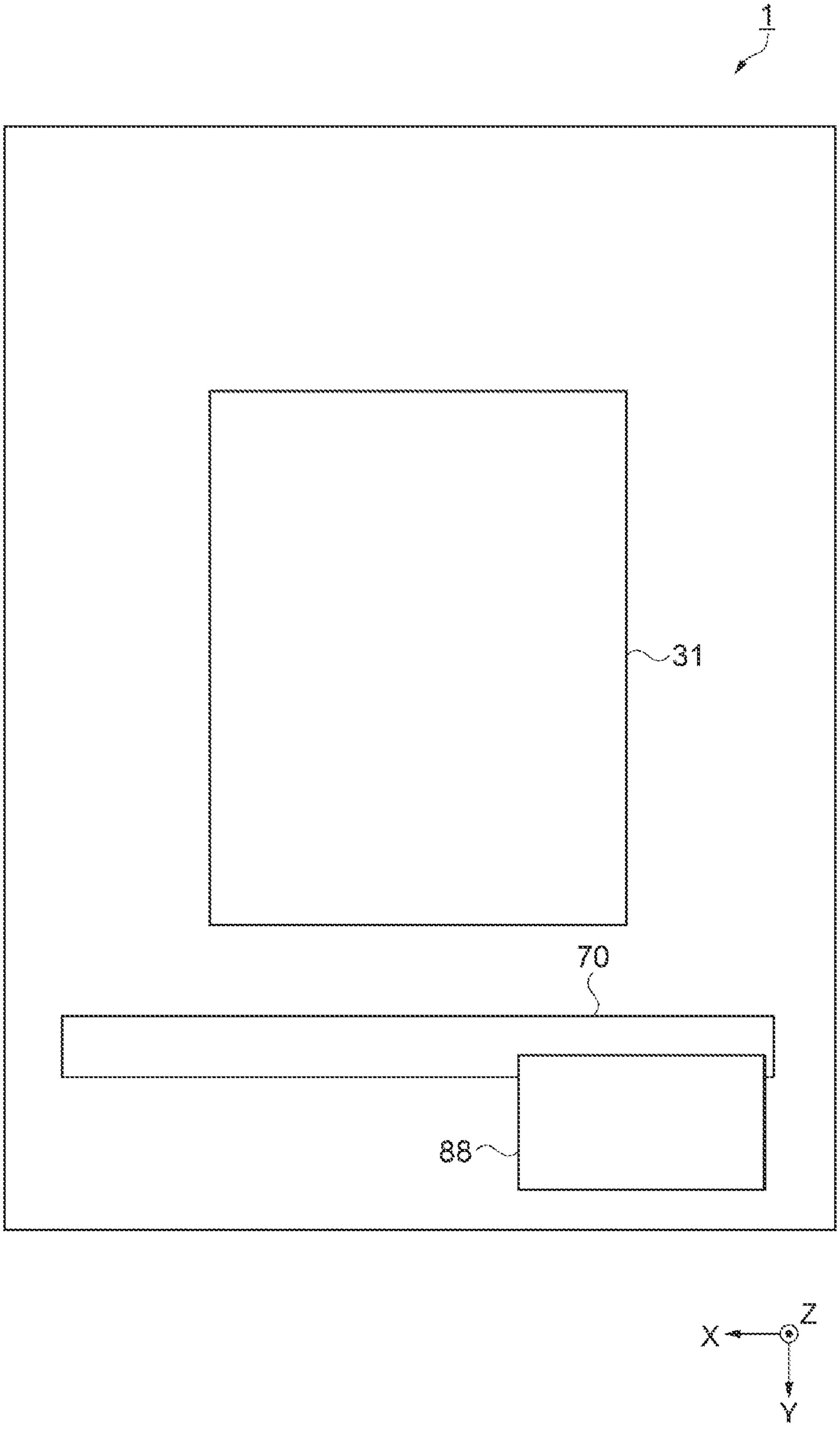
FIG. 22 is a schematic plan view illustrating a secondary detection start position of the movement unit, the carriage, and the table.

The secondary detection is started from the secondary detection start position that is the arrangement illustrated in FIG. 22. The above-mentioned arrangement is also the arrangement in plan view from the +Z direction at the completion of the primary detection step S127. This can save the time for returning the movement unit 70 to the home position after the completion of the primary detection. Note that the primary detection may be started from the position illustrated in FIG. 22, and the secondary detection may be started from the home position. In this case, the direction in which the movement unit 70 moves along the Y axis becomes opposite regarding positive and negative.

Figure 23:
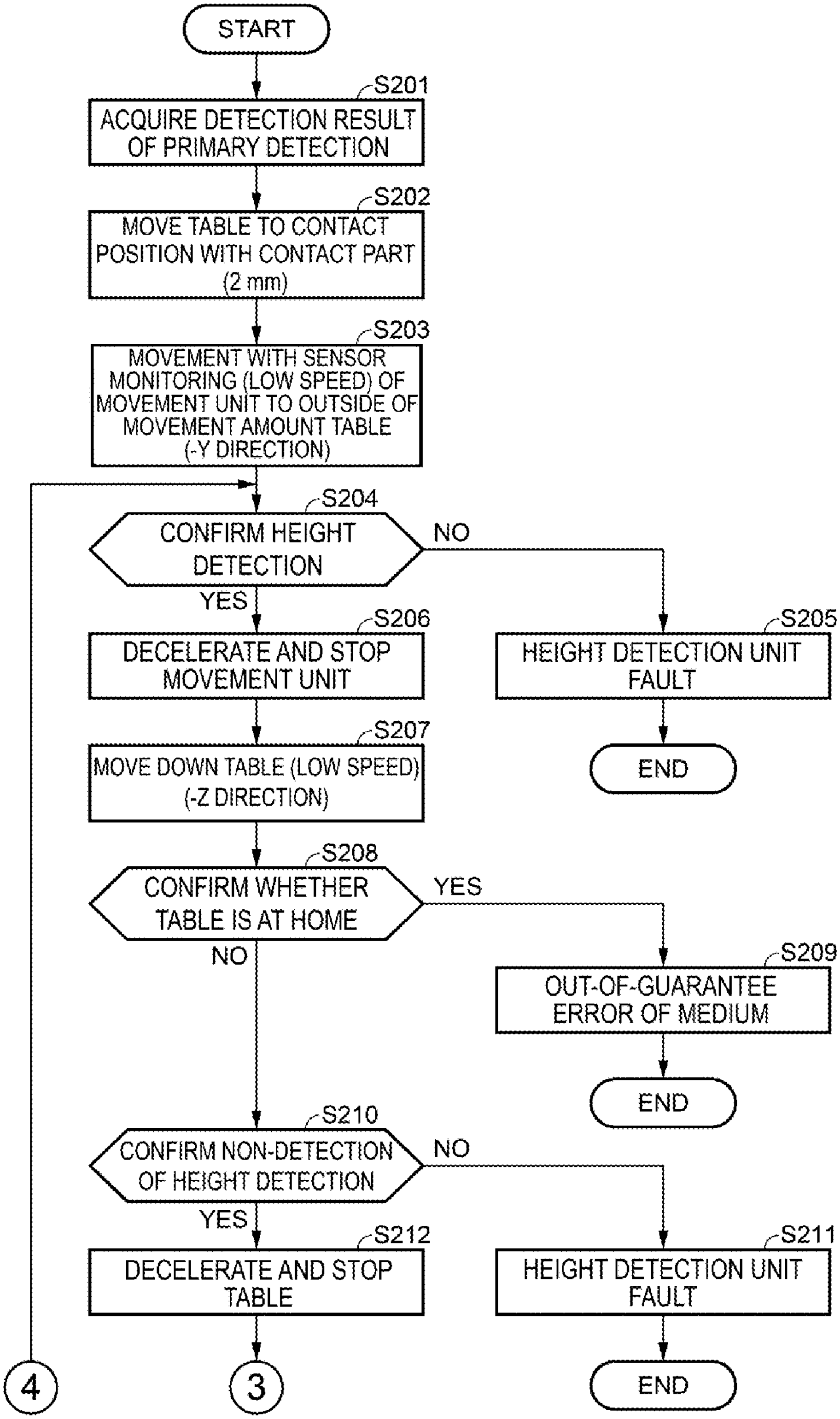
FIG. 23 is a flow chart illustrating a secondary detection operation.
Figure 24:
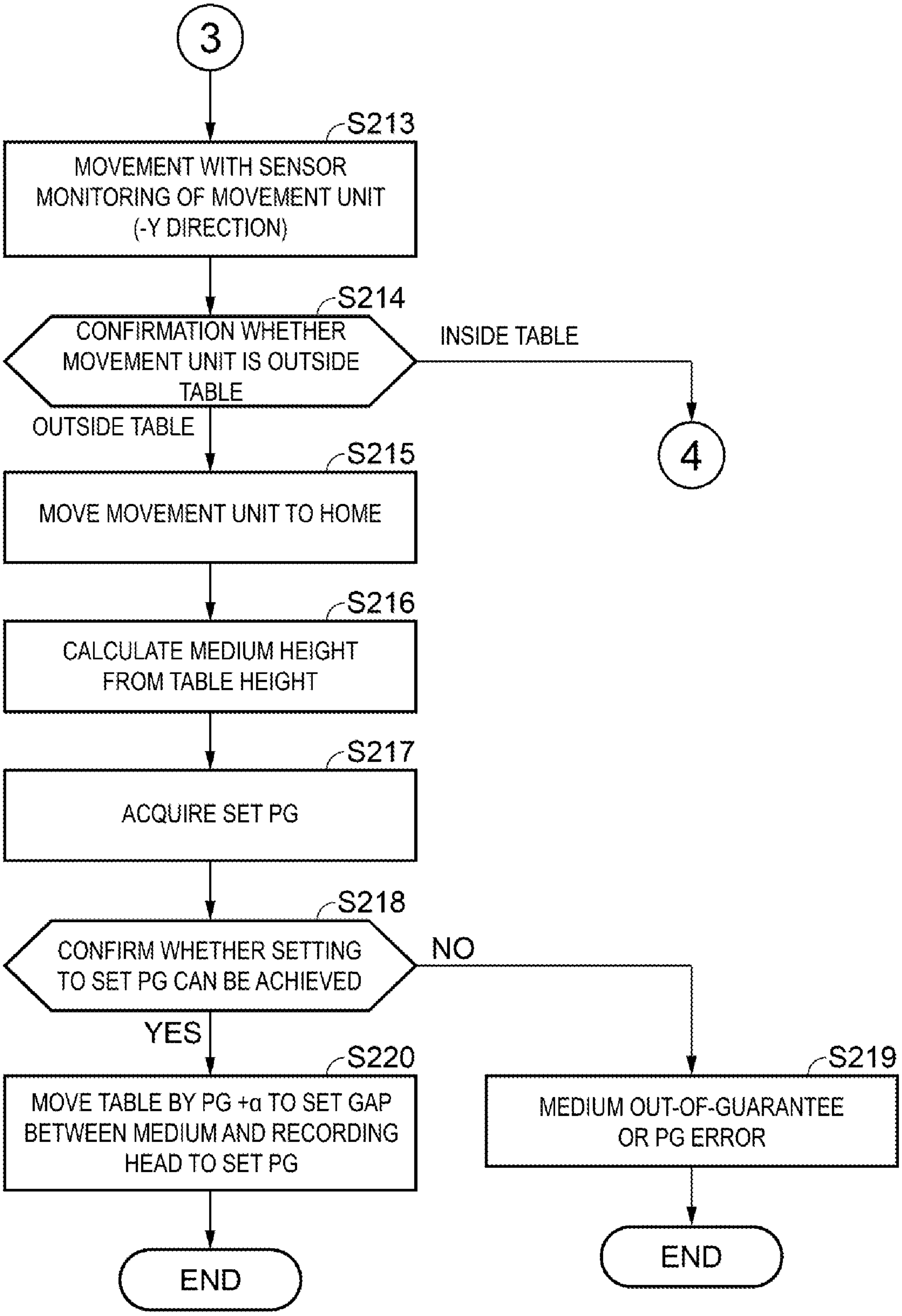
FIG. 24 is a flow chart illustrating the secondary detection operation.
Figure 25:
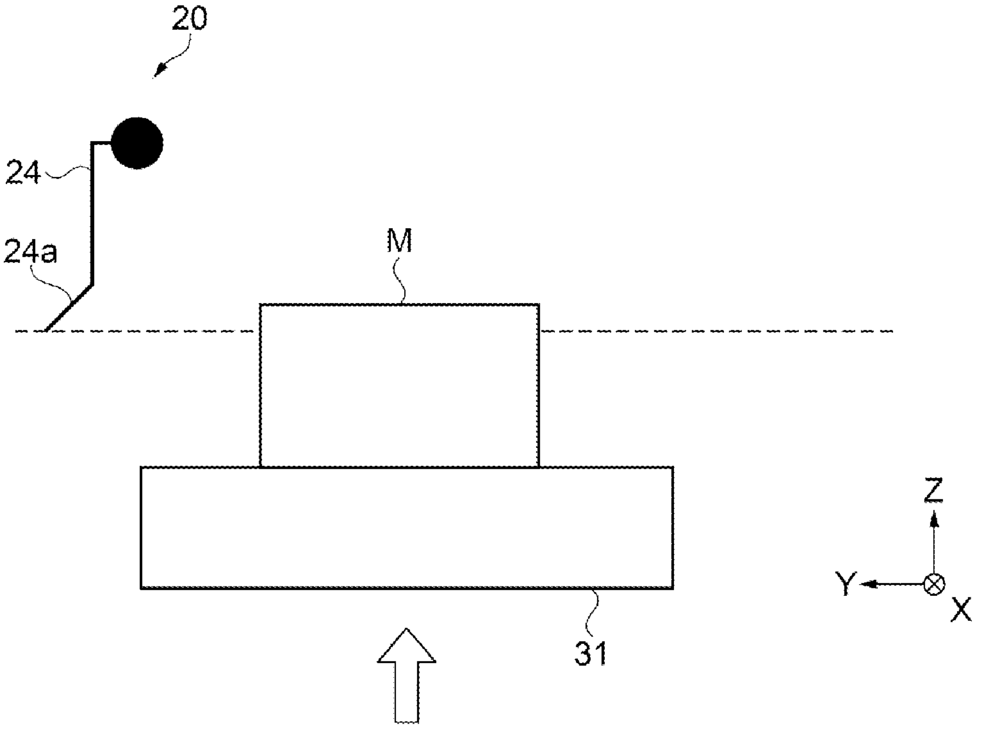
FIG. 25 is a schematic side view illustrating an operation of the secondary detection.

In the secondary detection, steps S201 to S220 are performed as illustrated in FIGS. 23 and 24.

At step S201, the detection result of the primary detection is acquired. At this time, the height detection unit 20 and the table 31 are located at the secondary detection start position, and are in the positional relationship illustrated in FIG. 25 in a side view from the −X direction. Then the process proceeds to step S202.

At step S202, the table 31 is moved up to an estimated position where the contact part 24*a* and the medium M make contact with each other. At this time, the above-mentioned estimated position is a position based on a rough height of the medium M that is the detection result of the primary detection, where the contact part 24*a* and the medium M always make contact with each other. The movement amount of the table 31 is, for example, 2 mm. Then the process proceeds to step S203.

At step S203, the movement unit 70 is moved in the −Y direction through the movement with sensor monitoring, and the height detection of the medium M is performed. The movement of the movement unit 70 is set to the second speed lower than the first speed. At this time, the contact part 24*a* may be in slight contact with the medium M. In particular, it is preferable to use the slight contact for a thin medium M such as a medium with a film form. Then the process proceeds to step S204.

Figure 26:
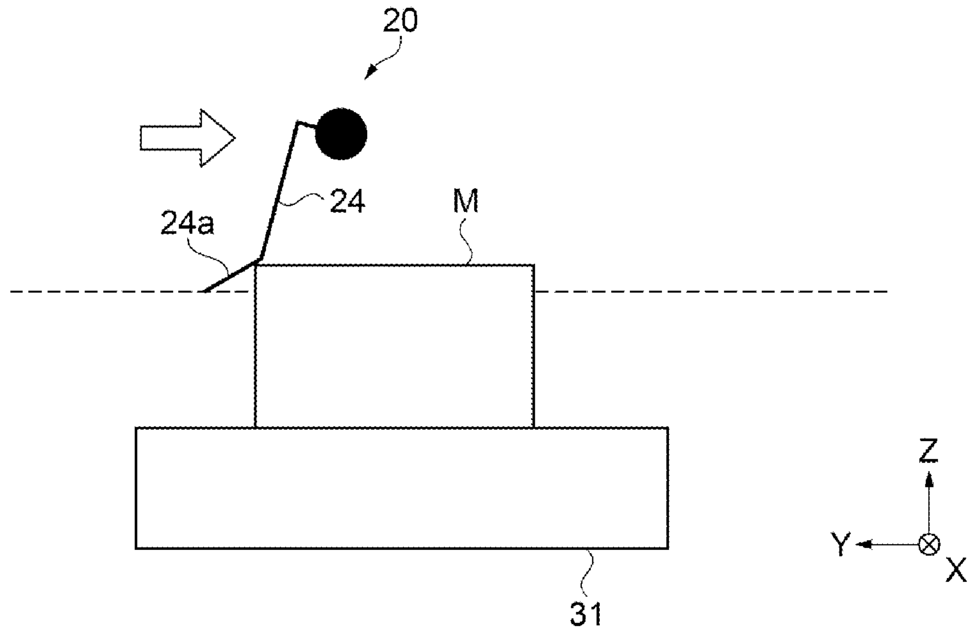
FIG. 26 is a schematic side view illustrating an operation of the secondary detection.

At step S204, the height detection of the height detection unit 20 in the movement of the movement unit 70 of step S203, i.e., whether the contact between the contact part 24*a* and the medium M is detected is confirmed. When the contact is not detected (NO), the process proceeds to step S205. As illustrated in FIG. 26, when the contact is detected (YES), the process proceeds to step S206.

At step S205, it is determined that a fault of the height detection unit 20 has occurred. Since step S204 is performed in the state where the contact is always detected, occurrence of a problem such as a fault is assumed when the contact is not detected. Then, a concern about occurrence of a fault is notified to the user. The recording apparatus 1 is set to the standby state, and the step is temporarily terminated.

At step S206, the movement of the movement unit 70 is stopped after it is decelerated. At this time, to suppress generation of chattering, the movement is decelerated before the stop. Then the process proceeds to step S207.

Figure 27:
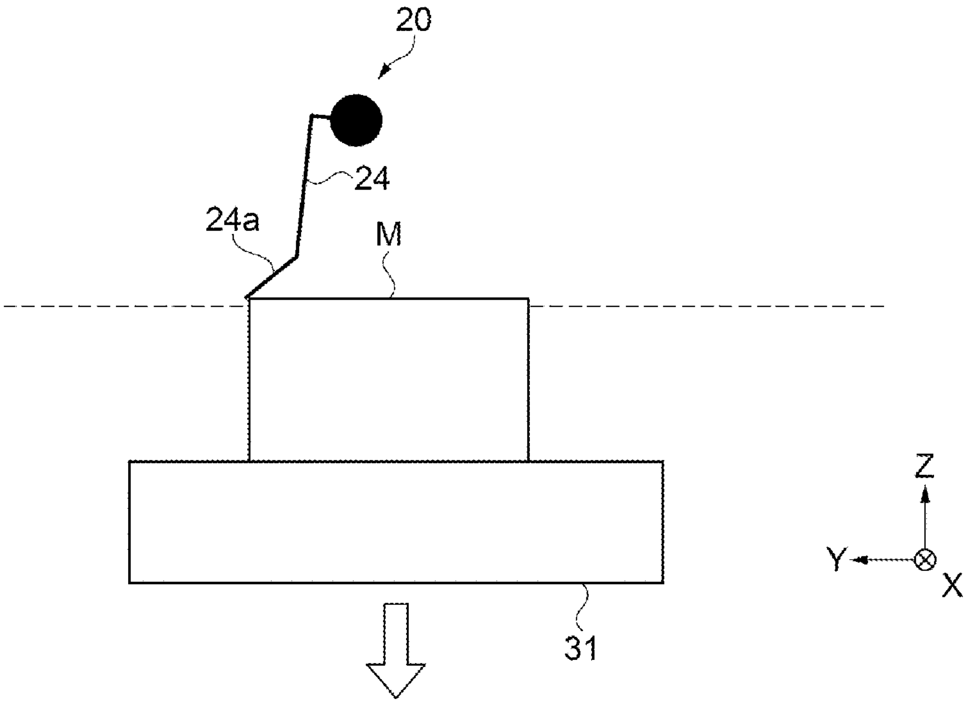
FIG. 27 is a schematic side view illustrating an operation of the secondary detection.

At step S207, the table 31 is moved down as illustrated in FIG. 27. At this time, the table 31 is moved down to the position where the contact is not detected or in other words the non-contact is detected by the height detection unit 20, and a state where the medium M and the contact part 24*a* are in slight contact with each other is set. In the case where step S203 is allowed to proceed while maintaining the slight contact in the secondary detection, chattering is easily generated at the contact part 24*a*. In particular, if the contact part 24*a* is separated from the medium M when a contact is detected, chattering is highly possibly generated. In view of this, it is preferable to maintain the slight contact state when the table 31 is moved down. Then the process proceeds to step S208.

Figure 28:
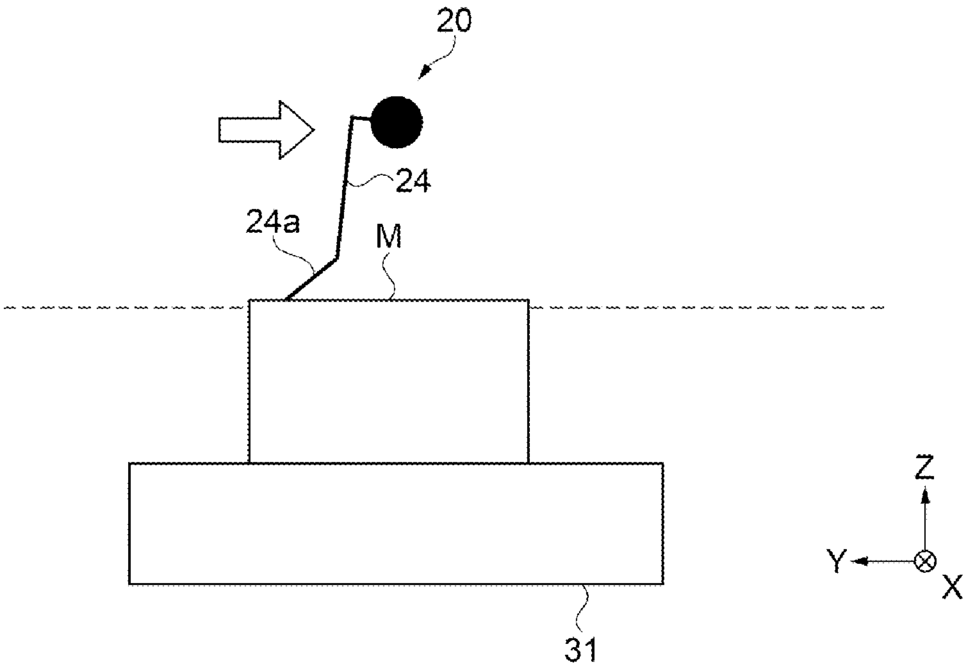
FIG. 28 is a schematic side view illustrating an operation of the secondary detection.

At step S208, whether the table 31 is located at the home position is confirmed. When the table 31 is located at the home position (YES), the process proceeds to step S209. When the table 31 is not located at the home position (NO), the movement with sensor monitoring of the movement unit 70 is restarted as illustrated in FIG. 28 and the process proceeds to step S210. At this time, the movement with sensor monitoring maintains the slight contact.

At step S09, the medium M is determined to be an out-of-guarantee error. Then, the out-of-guarantee error is notified to the user, the recording apparatus 1 is set to the standby state, and the step is temporarily terminated.

At step S210, the medium detection at the height detection unit 20 in the restarted movement of the movement unit 70, i.e., whether the contact between the contact part 24*a* and the medium M is not detected is confirmed. When the contact is detected (NO), the process proceeds to step S211. When the contact is not detected (YES), the process proceeds to step S212.

At step S211, it is determined that a fault of the height detection unit 20 has occurred. Then, a concern about occurrence of a fault is notified to the user. The recording apparatus 1 is set to the standby state, and the step is temporarily terminated.

At step S212, the movement of the table 31 is stopped after it is decelerated. Then the process proceeds to step S213 of FIG. 24.

Figure 29:
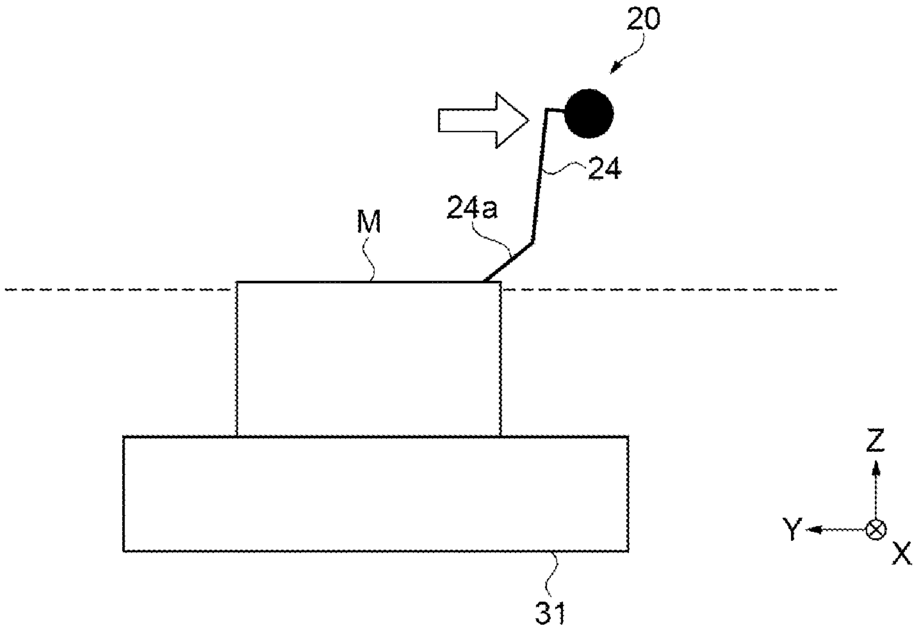
FIG. 29 is a schematic side view illustrating an operation of the secondary detection.

At step S213, the movement unit 70 is further moved in the −Y direction through the movement with sensor monitoring as illustrated in FIG. 29. Then the process proceeds to step S214.

At step S214, whether the movement unit 70 has moved in the −Y direction and has reached the −Y direction side outside the table 31 in plan view from the +Z direction is confirmed. When the movement unit 70 is inside the table 31, i.e., overlaps the table 31 in the above-mentioned plan view, the process returns to the stage after step S203 and before step S204 of FIG. 23. When the movement unit 70 is located on the outside of the table 31, i.e., the −Y direction side than the table 31 in the above-mentioned plan view, the process proceeds to step S215.

At step S215, the movement unit 70 is moved to the home position. Then the process proceeds to step S216.

At step S216, the control unit 90 calculates the height of the medium M from the height of the table 31, i.e., the position of the medium supporting part 31*m* along the Z axis. Then the process proceeds to step S217. The control unit 90 notifies the detection result of the secondary detection to the user through the above-described notification unit 99.

At step S217, the recording gap to be set is acquired from the height of the medium M. Then the process proceeds to step S218.

At step S218, whether the acquired recording gap to be set can be set is confirmed. When the setting can be achieved (YES), the process proceeds to step S220. When the setting cannot be achieved (NO), the process proceeds to step S219.

At step S219, it is determined to be an out-of-guarantee error of the medium M or a recording gap error. Then, the determination result is notified to the user. The recording apparatus 1 is set to the standby state, and the step is temporarily terminated.

Figure 30:
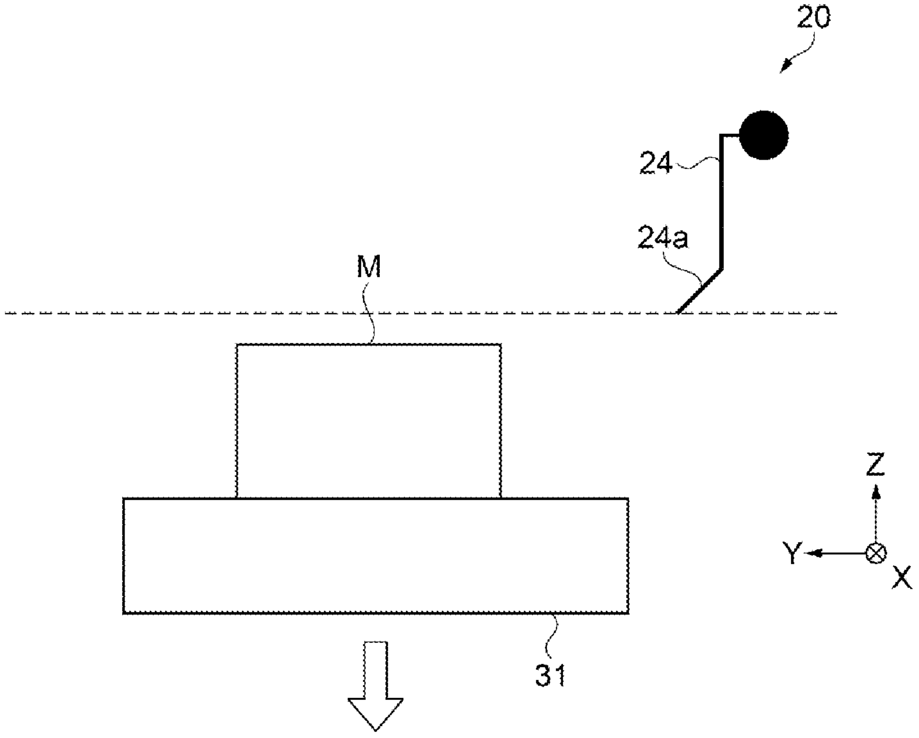
FIG. 30 is a schematic side view illustrating an operation of the secondary detection.

At step S220, the table 31 is moved down as illustrated in FIG. 30 to match the distance between the lower end of the recording head 89 and the medium M to the preset value of the above-mentioned recording gap. Thus, the fault detection and the height detection are completed, and an appropriate recording gap is set, allowing for a recording operation on the medium M.

According to this embodiment, the following effects can be achieved.

Reduction in the size of the recording apparatus 1 and reduction in time for the height detection of the medium M can be both achieved. Specifically, the contact part 24*a* is located at a position overlapping the medium supporting part 31*m* in the direction along the X axis. Therefore, for example, it is not necessary to provide the height detection unit 20 at a position protruding from the movement unit 70 in the direction along the X axis. In this manner, the height detection of the medium M can be achieved without providing the member protruding to the periphery of the medium supporting part 31*m*.

Since a rough height of the medium M is detected through the primary detection, the height adjustment manually performed in known techniques is omitted. Further, the specific height of the medium M is detected through the secondary detection. The primary detection and the secondary detection are automatically performed by the control unit 90, and thus the convenience of the user is also improved. In addition, the movement direction of the contact part 24*a* is opposite between the primary detection and the secondary detection. Therefore, the secondary detection is started without resetting the movement unit 70 and the contact part 24*a* to the position where the primary detection is started after the completion of the primary detection. In this manner, the time for the height detection of the medium M can be reduced.

Furthermore, since the primary detection and the secondary detection are performed, the accuracy of the height detection can be improved while reducing the height detection time. In the above-described manner, it is possible to provide the recording apparatus 1 and the recording method that achieve both the size reduction and the time reduction for the height detection of the medium M, and improve the accuracy of the height detection.

What is claimed is:

1. A recording apparatus comprising:
a medium supporting part configured to support a medium;
a recording unit configured to perform recording on the medium;
a movement unit configured to relatively move with respect to the medium supporting part along a first axis;
a detection unit attached to the movement unit; and
a control unit, wherein
the detection unit includes:
an arm part turnably coupled to the movement unit,
a contact part fixed at one end of the arm part, and
a displacement detection unit configured to detect contact and non-contact of the contact part and the medium,
the contact part is disposed to overlap the medium supporting part in a second axis orthogonal to the first axis,
the medium supporting part is configured to relatively move along a third axis orthogonal to the first axis and the second axis with respect to the movement unit,
the arm part turns about a turning shaft when the contact part makes contact with the medium while the movement unit moves,
the displacement detection unit detects the contact and the non-contact based on a turn of the arm part,
the control unit causes the detection unit to perform primary detection and secondary detection subsequent to the primary detection,
in the primary detection, the displacement detection unit detects the contact and the non-contact while moving the contact part in a first direction along the first axis such that when the contact is detected, a movement in the first direction is interrupted, and that the movement in the first direction is restarted after the medium supporting part is separated from the movement unit by a first distance along the third axis, and
in the secondary detection, the displacement detection unit detects the contact and the non-contact while moving the contact part in a second direction opposite to the first direction such that when the contact is detected, a movement in the second direction is interrupted, and that the movement in the second direction is restarted after the medium supporting part is separated from the movement unit along the third axis until the non-contact is detected.

2. The recording apparatus according to claim 1, wherein
the control unit causes the displacement detection unit to perform a fault detection preceding the primary detection, and
a fault of the detection unit is confirmed in the fault detection.

3. The recording apparatus according to claim 1, further comprising a notification unit, wherein
the control unit provides a notification of a detection result of the primary detection and the secondary detection to a user through the notification unit.

4. The recording apparatus according to claim 1, wherein in the primary detection, when the movement in the first direction is completed without the contact being detected, the control unit operates such that the secondary detection is performed without performing an error determination.

5. The recording apparatus according to claim 1, wherein
in the primary detection, the movement unit moves in the first direction at a first speed,
in the secondary detection, the movement unit moves in the second direction at a second speed, and
the first speed is higher than the second speed.

6. A recording method using a recording apparatus, the recording apparatus comprising:
a medium supporting part configured to support a medium;
a recording unit configured to perform recording on the medium;
a movement unit configured to relatively move with respect to the medium supporting part along a first axis;
a detection unit attached to the movement unit; and
a control unit, wherein
the detection unit includes:
an arm part turnably coupled to the movement unit,
a contact part fixed at one end of the arm part, and
a displacement detection unit configured to detect contact and non-contact of the contact part and the medium,
the contact part is disposed to overlap the medium supporting part in a second axis orthogonal to the first axis,
the medium supporting part is configured to relatively move along a third axis orthogonal to the first axis and the second axis with respect to the movement unit,
the arm part turns about a turning shaft when the contact part makes contact with the medium while the movement unit moves,
the displacement detection unit detects the contact and the non-contact based on a turn of the arm part,
the control unit causes the displacement detection unit to perform primary detection and secondary detection subsequent to the primary detection,
in the primary detection, the displacement detection unit detects the contact and the non-contact while moving the contact part in a first direction along the first axis such that when the contact is detected, a movement in the first direction is interrupted, and that the movement in the first direction is restarted after the medium supporting part is separated from the movement unit by a first distance along the third axis, and
in the secondary detection, the displacement detection unit detects the contact and the non-contact while moving the contact part in a second direction opposite to the first direction such that when the contact is detected, a movement in the second direction is interrupted, and that the movement in the second direction is restarted after the medium supporting part is separated from the movement unit along the third axis until the non-contact is detected.

* * * * *